US008517818B2

(12) United States Patent
Nicely et al.

(10) Patent No.: US 8,517,818 B2
(45) **Date of Patent: *Aug. 27, 2013**

(54) GAMING SYSTEM, GAMING DEVICE AND METHOD FOR PROVIDING A MULTIPLE PLAYER, MULTIPLE GAME BONUSING ENVIRONMENT

(75) Inventors: Mark C. Nicely, Daly City, CA (US); Carmen Tan, Daly City, CA (US); Alan R. Weiss, Petaluma, CA (US)

(73) Assignee: IGT, Las Vegas, NV (US)

(*) Notice: Subject to any disclaimer, the term of this patent is extended or adjusted under 35 U.S.C. 154(b) by 33 days.

This patent is subject to a terminal disclaimer.

(21) Appl. No.: 13/247,115

(22) Filed: Sep. 28, 2011

(65) Prior Publication Data

US 2013/0079112 A1 Mar. 28, 2013

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................................. 463/20; 463/16; 463/25

(58) Field of Classification Search
USPC .... 463/16–20, 25, 40–42, 29–31; 273/138.1, 273/139
See application file for complete search history.

(56) References Cited

U.S. PATENT DOCUMENTS

| | | | |
|---|---|---|---|
| 4,669,731 | A | 6/1987 | Clarke |
| 4,991,848 | A | 2/1991 | Greenwood et al. |
| 5,116,055 | A | 5/1992 | Tracy |
| 5,167,571 | A | 12/1992 | Waller |
| 5,275,402 | A | 1/1994 | Malavazos et al. |
| 5,542,669 | A | 8/1996 | Charron et al. |
| 5,564,700 | A | 10/1996 | Celona |
| 5,580,309 | A | 12/1996 | Piechowiak et al. |
| 5,611,730 | A | 3/1997 | Weiss |

(Continued)

FOREIGN PATENT DOCUMENTS

| | | |
|---|---|---|
| WO | WO00/32286 | 6/2000 |
| WO | WO2006/005073 | 1/2006 |

(Continued)

OTHER PUBLICATIONS

Office Action for U.S. Appl. No. 13/247,121, dated Nov. 21, 2012.

(Continued)

*Primary Examiner* — Milap Shah

(74) *Attorney, Agent, or Firm* — Neal, Gerber & Eisenberg LLP

(57) ABSTRACT

A gaming system and method for exchanging one or more triggered individual bonus games for one or more current plays of a community game or one or more future plays of a community game. If an individual bonus game is triggered in association with an individual gaming device, the gaming system enables the player to: (i) play the triggered individual bonus game, (ii) skip the individual bonus game and play or participate in a community or group game, or (iii) skip the individual bonus game and save an entry to play or participate in a future community or group game. In these embodiments, the gaming system determines one or more features or attributes of the available community game (which the player may play or defer play of) based, at least in part, on which of a plurality of different individual bonus games are triggered.

24 Claims, 12 Drawing Sheets

(56) References Cited

U.S. PATENT DOCUMENTS 5,655,961 A 8/1997 Acres et al.
5,664,700 A 9/1997 Battle
5,752,699 A 5/1998 Crompton et al.
5,766,076 A 6/1998 Pease et al.
5,769,716 A 6/1998 Saffari et al.
5,833,537 A 11/1998 Barrie
5,855,515 A 1/1999 Pease et al.
5,876,284 A 3/1999 Acres et al.
5,885,158 A 3/1999 Torango et al.
6,012,982 A 1/2000 Piechowiak et al.
6,068,552 A 5/2000 Walker et al.
6,089,980 A 7/2000 Gauselmann
6,135,884 A 10/2000 Hedrick et al.
6,162,121 A 12/2000 Morro et al.
6,168,523 B1 1/2001 Piechowiak et al.
6,217,448 B1 4/2001 Olsen
6,231,445 B1 5/2001 Acres
6,309,299 B1 10/2001 Weiss
6,334,614 B1 1/2002 Breeding
6,336,863 B1 1/2002 Baerlocher et al.
6,343,989 B1 2/2002 Wood et al.
6,375,187 B1 4/2002 Baerlocher
6,386,974 B1 5/2002 Adams
6,390,473 B1 5/2002 Vancura et al.
6,435,511 B1 8/2002 Vancura et al.
RE37,885 E 10/2002 Acres et al.
6,494,785 B1 12/2002 Gerrard et al.
6,506,118 B1 1/2003 Baerlocher et al.
6,514,141 B1 2/2003 Kaminkow et al.
6,520,500 B2 2/2003 Pierce et al.
6,550,768 B2 4/2003 Jordan
6,554,283 B2 4/2003 Vancura et al.
6,554,704 B2 4/2003 Nicastro et al.
6,565,086 B2 5/2003 Williams et al.
6,569,015 B1 5/2003 Baerlocher et al.
6,572,472 B1 6/2003 Glavich
6,599,192 B1 7/2003 Baerlocher et al.
6,599,193 B2 7/2003 Baerlocher et al.
6,602,136 B1 8/2003 Baerlocher et al.
6,632,141 B2 10/2003 Webb et al.
6,648,754 B2 11/2003 Baerlocher et al.
6,692,005 B2 2/2004 Vancura et al.
6,692,355 B2 2/2004 Baerlocher et al.
6,719,632 B2 4/2004 Palmer et al.
6,722,981 B2 4/2004 Kaminkow et al.
6,722,982 B2 4/2004 Kaminkow et al.
6,726,563 B1 4/2004 Baerlocher et al.
6,758,750 B2 7/2004 Baerlocher et al.
6,780,111 B2 8/2004 Cannon et al.
6,783,455 B2 8/2004 Glavich
6,786,819 B2 9/2004 Baerlocher et al.
6,786,820 B2 9/2004 Gerrard et al.
6,793,579 B2 9/2004 Baerlocher et al.
6,796,905 B2 9/2004 Baerlocher et al.
6,808,452 B2 10/2004 Baerlocher et al.
6,808,454 B2 10/2004 Gerrard et al.
6,811,483 B1 11/2004 Webb et al.
6,852,030 B2 2/2005 Baerlocher et al.
6,890,257 B2 5/2005 Baerlocher
6,899,623 B2 5/2005 Baerlocher
6,908,383 B2 6/2005 Baerlocher
6,942,566 B2 9/2005 Baerlocher et al.
6,942,567 B2 9/2005 Baerlocher et al.
RE38,812 E 10/2005 Acres et al.
6,955,600 B2 10/2005 Glavich et al.
6,960,132 B2 11/2005 Baerlocher et al.
6,966,833 B2 11/2005 Kaminkow et al.
6,966,834 B1 11/2005 Johnson
6,971,953 B2 12/2005 Gerrard et al.
6,988,947 B2 1/2006 Baerlocher et al.
7,000,921 B2 2/2006 Schultz
7,001,273 B2 2/2006 Baerlocher
7,040,984 B2 5/2006 Mead
7,048,628 B2 5/2006 Schneider
7,052,392 B2 * 5/2006 Tessmer et al. ................. 463/16
7,056,215 B1 6/2006 Olive
7,070,501 B2 7/2006 Cormack et al.
7,111,845 B2 9/2006 Walker et al.
7,144,321 B2 12/2006 Mayeroff
7,160,186 B2 1/2007 Cuddy et al.
7,169,044 B2 1/2007 Baerlocher et al.
7,192,349 B2 3/2007 Baerlocher et al.
7,223,172 B2 5/2007 Baerlocher et al.
7,235,009 B2 6/2007 Baerlocher
7,235,010 B2 6/2007 Baerlocher
7,250,001 B2 7/2007 Baerlocher et al.
7,264,545 B2 9/2007 Maya et al.
7,267,615 B2 9/2007 Rodden et al.
7,270,604 B2 9/2007 Gerrard et al.
7,291,066 B2 11/2007 Gauselmann
7,311,304 B1 12/2007 Kelly
7,311,598 B2 12/2007 Kaminkow et al.
7,311,604 B2 12/2007 Kaminkow et al.
7,314,408 B2 1/2008 Cannon
7,326,114 B2 2/2008 Webb et al.
7,331,864 B2 2/2008 Baerlocher
7,335,102 B2 2/2008 Baerlocher et al.
7,351,140 B2 4/2008 Wolf et al.
7,364,507 B2 4/2008 Baerlocher et al.
7,407,435 B2 8/2008 Baerlocher et al.
7,416,485 B2 8/2008 Walker et al.
7,427,236 B2 9/2008 Kaminkow et al.
7,438,961 B2 10/2008 Steinke et al.
7,448,949 B2 11/2008 Kaminkow et al.
7,470,184 B2 12/2008 Baerlocher et al.
7,624,986 B2 12/2009 Nicely
7,654,896 B2 2/2010 Baerlocher
7,666,081 B2 2/2010 Baerlocher et al.
7,674,180 B2 3/2010 Graham et al.
7,811,167 B2 10/2010 Giobbi et al.
7,871,323 B2 1/2011 Walker et al.
7,963,847 B2 6/2011 Baerlocher
7,976,379 B2 7/2011 Baerlocher
7,985,133 B2 7/2011 Baerlocher et al.
7,993,199 B2 8/2011 Iddings et al.
8,087,995 B2 * 1/2012 Englman et al. ................ 463/23
8,187,068 B2 5/2012 Slomiany et al.
8,282,489 B2 10/2012 Arezina et al.
8,287,364 B2 10/2012 Caputo et al.
2002/0022509 A1 2/2002 Nicastro et al.
2003/0040360 A1 2/2003 Kaminkow
2003/0078093 A1 4/2003 Simms et al.
2003/0078102 A1 4/2003 Okita et al.
2003/0114218 A1 * 6/2003 McClintic ....................... 463/25
2003/0162584 A1 8/2003 Hughs-Baird et al.
2003/0186733 A1 10/2003 Wolf et al.
2003/0216166 A1 11/2003 Baerlocher et al.
2003/0236116 A1 12/2003 Marks et al.
2004/0036224 A1 2/2004 Crompton
2004/0048644 A1 3/2004 Gerrard et al.
2004/0106444 A1 6/2004 Cuddy et al.
2004/0152509 A1 8/2004 Hornik et al.
2004/0180710 A1 9/2004 Palmer et al.
2004/0266516 A1 12/2004 Thomas
2004/0266517 A1 12/2004 Bleich et al.
2005/0020342 A1 1/2005 Palmer et al.
2005/0032567 A1 2/2005 Baerlocher et al.
2005/0037829 A1 2/2005 Baerlocher et al.
2005/0054413 A1 3/2005 Randall et al.
2005/0054436 A1 3/2005 Frizzell et al.
2005/0101375 A1 5/2005 Webb et al.
2005/0124281 A1 6/2005 Marchini et al.
2005/0130729 A1 6/2005 Baerlocher et al.
2005/0130731 A1 6/2005 Englman et al.
2005/0143170 A1 6/2005 Maya et al.
2005/0181860 A1 8/2005 Nguyen et al.
2005/0215314 A1 9/2005 Schneider et al.
2006/0003837 A1 1/2006 Baerlocher et al.
2006/0025195 A1 2/2006 Pennington et al.
2006/0030403 A1 2/2006 Lafky et al.
2006/0035694 A1 2/2006 Fuller
2006/0035696 A1 2/2006 Walker et al.
2006/0040723 A1 2/2006 Baerlocher et al.
2006/0040732 A1 2/2006 Baerlocher et al.

| | | | | |
|---|---|---|---|---|
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2006/0089194 | A1 | 4/2006 | Joshi et al. | |
| 2006/0094509 | A1 | 5/2006 | Michaelson et al. | |
| 2006/0116194 | A1 | 6/2006 | Pacey et al. | |
| 2006/0121966 | A1 | 6/2006 | Baerlocher | |
| 2006/0121971 | A1* | 6/2006 | Slomiany et al. | 463/16 |
| 2006/0160620 | A1 | 7/2006 | Matthews et al. | |
| 2006/0172791 | A1 | 8/2006 | Wolf | |
| 2006/0178203 | A1 | 8/2006 | Hughes et al. | |
| 2006/0183535 | A1 | 8/2006 | Marks et al. | |
| 2006/0252506 | A1 | 11/2006 | Walker et al. | |
| 2006/0287043 | A1* | 12/2006 | Englman et al. | 463/16 |
| 2007/0032286 | A1 | 2/2007 | Muir | |
| 2007/0054733 | A1 | 3/2007 | Baerlocher et al. | |
| 2007/0060246 | A1 | 3/2007 | Baerlocher et al. | |
| 2007/0060271 | A1 | 3/2007 | Cregan et al. | |
| 2007/0060292 | A1 | 3/2007 | Peterson | |
| 2007/0060297 | A1 | 3/2007 | Hein et al. | |
| 2007/0060314 | A1 | 3/2007 | Baerlocher et al. | |
| 2007/0060321 | A1 | 3/2007 | Vasquez et al. | |
| 2007/0077979 | A1 | 4/2007 | Cohn et al. | |
| 2007/0077981 | A1 | 4/2007 | Hungate et al. | |
| 2007/0077990 | A1 | 4/2007 | Cuddy et al. | |
| 2007/0105619 | A1 | 5/2007 | Kniestead et al. | |
| 2007/0105620 | A1 | 5/2007 | Cuddy et al. | |
| 2007/0129131 | A1 | 6/2007 | Kaminkow et al. | |
| 2007/0149292 | A1 | 6/2007 | Kaminkow et al. | |
| 2007/0155466 | A1 | 7/2007 | Baerlocher et al. | |
| 2007/0155480 | A1 | 7/2007 | Brosnan et al. | |
| 2007/0155485 | A1 | 7/2007 | Cuddy et al. | |
| 2007/0167208 | A1 | 7/2007 | Acres | |
| 2007/0167217 | A1 | 7/2007 | Macvittie et al. | |
| 2007/0184887 | A1 | 8/2007 | Cannon | |
| 2007/0191088 | A1 | 8/2007 | Breckner et al. | |
| 2007/0207850 | A1 | 9/2007 | Darrah et al. | |
| 2007/0218975 | A1 | 9/2007 | Iddings et al. | |
| 2007/0218982 | A1 | 9/2007 | Baerlocher et al. | |
| 2007/0259711 | A1 | 11/2007 | Thomas | |
| 2007/0259713 | A1 | 11/2007 | Fiden et al. | |
| 2007/0298872 | A1 | 12/2007 | Gerrard et al. | |
| 2007/0298874 | A1 | 12/2007 | Baerlocher et al. | |
| 2007/0298875 | A1 | 12/2007 | Baerlocher et al. | |
| 2008/0020817 | A1 | 1/2008 | Kaminkow et al. | |
| 2008/0020822 | A1 | 1/2008 | Cuddy et al. | |
| 2008/0020823 | A1 | 1/2008 | Cuddy et al. | |
| 2008/0020824 | A1 | 1/2008 | Cuddy et al. | |
| 2008/0020825 | A1 | 1/2008 | Cuddy et al. | |
| 2008/0020829 | A1 | 1/2008 | Baerlocher | |
| 2008/0020830 | A1 | 1/2008 | Ikehara et al. | |
| 2008/0020831 | A1 | 1/2008 | Ikehara et al. | |
| 2008/0020832 | A1 | 1/2008 | Iddings et al. | |
| 2008/0020833 | A1 | 1/2008 | Baerlocher et al. | |
| 2008/0020834 | A1 | 1/2008 | Breckner et al. | |
| 2008/0020846 | A1 | 1/2008 | Vasquez et al. | |
| 2008/0020847 | A1 | 1/2008 | Kniesteadt et al. | |
| 2008/0032764 | A1 | 2/2008 | Cannon | |
| 2008/0051168 | A1 | 2/2008 | Kaminkow et al. | |
| 2008/0064459 | A1 | 3/2008 | Kelly | |
| 2008/0070676 | A1 | 3/2008 | Baerlocher et al. | |
| 2008/0070677 | A1 | 3/2008 | Baerlocher et al. | |
| 2008/0070678 | A1 | 3/2008 | Baerlocher et al. | |
| 2008/0070702 | A1 | 3/2008 | Kaminkow et al. | |
| 2008/0076534 | A1 | 3/2008 | Iddings | |
| 2008/0081690 | A1 | 4/2008 | Baerlocher et al. | |
| 2008/0081691 | A1 | 4/2008 | Baerlocher et al. | |
| 2008/0102916 | A1 | 5/2008 | Kovacs | |
| 2008/0102920 | A1 | 5/2008 | Baerlocher et al. | |
| 2008/0108401 | A1 | 5/2008 | Baerlocher et al. | |
| 2008/0108423 | A1 | 5/2008 | Benbrahim et al. | |
| 2008/0108429 | A1 | 5/2008 | Davis et al. | |
| 2008/0113763 | A1 | 5/2008 | Michaelson et al. | |
| 2008/0113765 | A1 | 5/2008 | DeWaal | |
| 2008/0113768 | A1 | 5/2008 | Baerlocher | |
| 2008/0113770 | A1 | 5/2008 | Gelber et al. | |
| 2008/0113771 | A1 | 5/2008 | Baerlocher et al. | |
| 2008/0139274 | A1 | 6/2008 | Baerlocher et al. | |
| 2008/0139290 | A1 | 6/2008 | Kniesteadt et al. | |
| 2008/0153564 | A1 | 6/2008 | Baerlocher et al. | |
| 2008/0167118 | A1 | 7/2008 | Kroekel et al. | |
| 2008/0176650 | A1 | 7/2008 | Wolf et al. | |
| 2008/0176651 | A1 | 7/2008 | Okada | |
| 2008/0207315 | A1 | 8/2008 | Bloebaum et al. | |
| 2008/0214263 | A1 | 9/2008 | Walker et al. | |
| 2008/0300051 | A1 | 12/2008 | Walker et al. | |
| 2009/0011822 | A1 | 1/2009 | Englman et al. | |
| 2009/0011823 | A1 | 1/2009 | Englman et al. | |
| 2009/0011824 | A1 | 1/2009 | Englman et al. | |
| 2009/0036202 | A1 | 2/2009 | Baerlocher et al. | |
| 2009/0117994 | A1 | 5/2009 | Kelly | |
| 2009/0124332 | A1 | 5/2009 | Baerlocher | |
| 2009/0124362 | A1 | 5/2009 | Cuddy et al. | |
| 2009/0163261 | A1 | 6/2009 | Crompton | |
| 2010/0081497 | A1 | 4/2010 | Wolf et al. | |
| 2010/0120491 | A1 | 5/2010 | McLaughlin et al. | |
| 2010/0120498 | A1 | 5/2010 | Cuddy et al. | |
| 2010/0120503 | A1 | 5/2010 | Hoffman et al. | |
| 2010/0120505 | A1 | 5/2010 | Caputo et al. | |
| 2010/0120525 | A1 | 5/2010 | Baerlocher et al. | |
| 2010/0124969 | A1 | 5/2010 | Hughes et al. | |
| 2010/0137056 | A1 | 6/2010 | Hoffman et al. | |
| 2010/0240442 | A1 | 9/2010 | Anderson et al. | |
| 2010/0304825 | A1 | 12/2010 | Davis et al. | |
| 2010/0331069 | A1 | 12/2010 | Giobbi et al. | |
| 2011/0105216 | A1 | 5/2011 | Cohen et al. | |
| 2011/0201410 | A1 | 8/2011 | Englman et al. | |
| 2011/0312409 | A1 | 12/2011 | Vancura | |
| 2012/0108319 | A1 | 5/2012 | Caputo et al. | |
| 2012/0122550 | A1 | 5/2012 | Johnson et al. | |

FOREIGN PATENT DOCUMENTS

| | | |
|---|---|---|
| WO | WO2006/044252 | 4/2006 |
| WO | WO2006/130611 | 12/2006 |
| WO | WO2007/117502 | 10/2007 |
| WO | WO2007/130464 | 11/2007 |
| WO | WO2007/139874 | 12/2007 |
| WO | WO2007/139988 | 12/2007 |
| WO | WO2008/048634 | 4/2008 |

OTHER PUBLICATIONS

Office Action for U.S. Appl. No. 13/247,147, dated Sep. 24, 2012.
Office Action for U.S. Appl. No. 13/247,095, dated Oct. 4, 2012.
Office Action for U.S. Appl. No. 13/247,095, dated Feb. 15, 2013.
Office Action for U.S. Appl. No. 13/247,147, dated Mar. 11, 2013.
Office Action for U.S. Appl. No. 13/247,143 dated Apr. 2, 2013.

* cited by examiner

GAMING SYSTEM, GAMING DEVICE AND METHOD FOR PROVIDING A MULTIPLE PLAYER, MULTIPLE GAME BONUSING ENVIRONMENT

CROSS REFERENCE TO RELATED APPLICATIONS

This application relates to the following commonly owned patent applications: "GAMING SYSTEM, GAMING DEVICE AND METHOD FOR PROVIDING A MULTIPLE PLAYER, MULTIPLE GAME BONUSING ENVIRONMENT WITH A MULTIPLE PLAYER COIN DROP GAME," Ser. No. 13/247,147, "GAMING SYSTEM, GAMING DEVICE AND METHOD FOR PROVIDING A MULTIPLE PLAYER, MULTIPLE GAME BONUSING ENVIRONMENT," Ser. No. 13/247,143, "GAMING SYSTEM, GAMING DEVICE AND METHOD FOR PROVIDING A MULTIPLE PLAYER, MULTIPLE GAME BONUSING ENVIRONMENT," Ser. No. 13/247,121, "GAMING SYSTEM, GAMING DEVICE AND METHOD FOR PROVIDING A MULTIPLE PLAYER, MULTIPLE GAME BONUSING ENVIRONMENT," Ser. No. 13/247,095, and "GAMING SYSTEM, GAMING DEVICE AND METHOD FOR PROVIDING A MULTIPLE PLAYER, MULTIPLE GAME BONUSING ENVIRONMENT," Ser. No. 13/247,104.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known gaming machines are configured such that the players of these gaming machines compete for one or more awards such as progressive awards. Such progressive awards are typically displayed by one or more secondary display devices above the bank or group of gaming machines. Other known gaming machines or gaming systems are configured such that the players share with each other or can each win one or more awards. These awards are sometimes displayed by one or more secondary display devices above the bank or group of gaming machines. These types of group or community gaming systems (where the players are either competing for awards, where the players are sharing awards, or where the players are winning awards at the same time) continues to grow in popularity. Certain of these group or community gaming systems create an aura of excitement and entertainment for the people playing the gaming machines of the system and for people watching play.

There is a continuing need to increase this excitement and entertainment for people playing and people watching play of group or community gaming systems. There is also need for new ways of providing better gaming experiences at gaming machines. There is a further need for increasing social interactivity among people playing and people watching play of gaming machines which are or are not part of a group or community gaming system.

SUMMARY

The present disclosure relates generally to gaming systems, gaming devices, and methods for providing a multiple player, multiple game bonusing environment.

In various embodiments, the gaming system and method disclosed herein provides for one or more triggered individual bonus games to be exchanged for one or more current plays of a community game or one or more future plays of a community game. In certain embodiments, if an individual or standalone bonus game is triggered in association with an individual gaming device, the gaming system gives the player several different options and particularly enables the player to: (i) play the triggered individual bonus game, (ii) skip the individual bonus game and play or participate in a community or group game, or (iii) skip the individual bonus game and save an entry to play or participate in a future community or group game. In these embodiments, the gaming system determines one or more features or attributes of the available community game (which the player may play or defer play of) based, at least in part, on which of a plurality of different individual bonus games are triggered. Put differently, because different bonus games which may be triggered have different average expected payouts, in equitably determining the features or attributes of the community game to make available for the player (and thus in determining the average expected payout of such a community game), the gaming system must account for the average expected payout of the triggered individual bonus game. Such a gaming system thus equates or normalizes each player's current or future participation in the community game to provide equality to players that trigger different individual bonus games at different gaming devices which are associated with different paytables.

More specifically, the gaming system of one embodiment disclosed herein maintains one or more different community games. At different points in time, these community games are being played by zero, one or more players at zero, one or more of the gaming devices of the gaming system. The gaming system causes one or more display devices, such as one or more display devices of one or more individual gaming devices, one or more web browsers or one or more community display devices, to continually display such community games (or at least part of or the status of such community games). This configuration provides that players (and any bystanders watching any of the plays of any of the community games) are aware (or may become aware) of any events currently occurring in any of the community games and/or any awards provided in association with any play of any of the community games.

In operation of one embodiment of the gaming system disclosed herein, the gaming system enables players at the gaming devices to wager on and play one or more of a plurality of different primary games. If an individual bonus game triggering event occurs in association with any of the gaming devices, the gaming system determines which of a plurality of individual bonus games to offer to the player. In this embodiment, different plays of different individual bonus games include different attributes or features and thus different plays of individual bonus games utilize different paytables having different average expected payouts. For example, one play of one individual bonus game of ten free spins of a plurality of reels will have a greater average expected payout than a play of an individual bonus game of five free spins of the plurality of reels.

After determining the individual bonus game to offer to the player, the gaming system determines the community game to offer to the player. More specifically, the gaming system determines one or more features or attributes of the community game to offer to the player, wherein the determined features or attributes are based, at least in part, on the determined individual bonus game triggered. Put differently, based, at least in part, on the average expected payout of the determined individual bonus game, the gaming system determines a configuration of the community game such that the average expected payout of the player's participation in the determined community game approximately corresponds to (or partially corresponds to) the average expected payout of the play of the determined individual bonus game. For example, the gaming system determines the features or attributes of a community game to offer to the player such that: (i) a first play of a community game having a first community game average expected payout is offered to the player if the gaming system determines to offer the player a first individual bonus game having a first individual bonus game average expected payout, and (ii) a second, different play of a community game having a second, greater community game average expected payout is offered to the player if the gaming system determines to offer the player a second individual bonus game having a second, greater individual bonus game average expected payout.

In one such embodiment, the community game is a multiple player virtual or video coin pusher or coin drop game which enables a player to selectively place one or more virtual or video coins or tokens in a coin engagement area. Such placement causes zero, one or more of other coins or tokens in a coin accumulation area to be provided to the player. In this example embodiment, the quantity of coins or tokens provided to the player (i.e., a feature or attribute of the community game) is based on the determined individual bonus game to offer to the player. For example, for a determined individual bonus game of ten free spins of a plurality of reels, the gaming system determines that a play of the coin pusher community game is associated with twelve coins for the player to place in the coin engagement area. In another example, for a determined individual bonus game of five free spins of the plurality of reels, the gaming system determines that a play of the coin pusher community game is associated with six coins for the player to place in the coin engagement area. It should be appreciated that the greater the quantity of coins or tokens provided to the player, the greater the quantity of chances that one or more coins or tokens will be provided to the player and thus the greater average expected payout for the player's play of this community game. For example, as one individual bonus game of ten free spins of a plurality of reels has a greater individual bonus game average expected payout than an individual bonus game of five free spins of the plurality of reels, the play of the coin pusher community game associated with the determined individual bonus game of ten free spins of a first game is associated with a greater quantity of coins for the player and thus has a greater coin pusher community game average expected payout than the play of the coin pusher community game associated with the determined individual bonus game of five free spins of the plurality of reels.

After determining the configuration of the community game to offer to the player, the gaming system enables the player to select to play the determined individual bonus game, play the determined community game or defer a play of the determined community game. That is, in association with the triggering of the individual bonus game, the gaming system enables the player to: (i) play the determined individual bonus game (and not play any determined community game), (ii) participate in a current play of the determined community game (and not play the determined individual bonus game), or (iii) defer participation in the community game until a future point in the time (and not play the determined individual bonus game or currently participate in the determined community game). In other words, the gaming system enables a player to exchange a play of an individual bonus game for a current or future play of a community game, wherein the determined play of the community game is configured to approximately correspond to the determined play of the individual bonus game.

If the player selects to play the determined individual bonus game, the gaming system displays a play of the determined individual bonus game to the player. This play of the determined individual bonus game includes determining a bonus game award, displaying the determined bonus game award and providing the determined bonus game award to the player. It should be appreciated that if the player selects to play the determined individual bonus game, the player does not participate in or play the community game that was determined based on the determined individual bonus game.

If the player selects to participate in a current play of the determined community game, the gaming system displays a play of the determined community game to the player. This play of the determined community game includes determining a community game award for the player, displaying the determined community game award and providing the determined community game award to the player. It should be appreciated that if the player selects to participate in a current play of the determined community game, the player does not participate in or play the determined individual bonus game.

If the player selects to participate in a future play of the determined community game, at that point in time, the gaming system does not enable the player to play the determined individual bonus game or participate in the current play the determined community game. Rather, the gaming system enables the player to save, hold or accumulate such an entry (or a plurality of entries) into the community game until the player decides to selectively enter and play the determined community game. At a future or subsequent point in time when the player decides to redeem any accumulated entries into the determined community game, the gaming system enables the player to participate in the community game. As described above, this subsequent play of the determined community game includes determining a community game award for the player, displaying the determined community game award and providing the determined community game award to the player.

Accordingly, the gaming system disclosed herein enables a player to exchange a play of an individual bonus game for a current or future play of a community game. Such a configuration provides an increased level of excitement and entertainment as player's must decide whether to participate in an individual bonus game or participate in a community game. Moreover, if the player decides to participate in a community game, the player is provided an increased level of excitement and entertainment as the player must decide whether to currently redeem their entry into the community game or wait to redeem their entry into the community game when the conditions for winning an award could be more or less favorable for the player.

Additional features and advantages of the disclosed embodiments are described in, and will be apparent from, the following Detailed Description of the Invention and the Figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
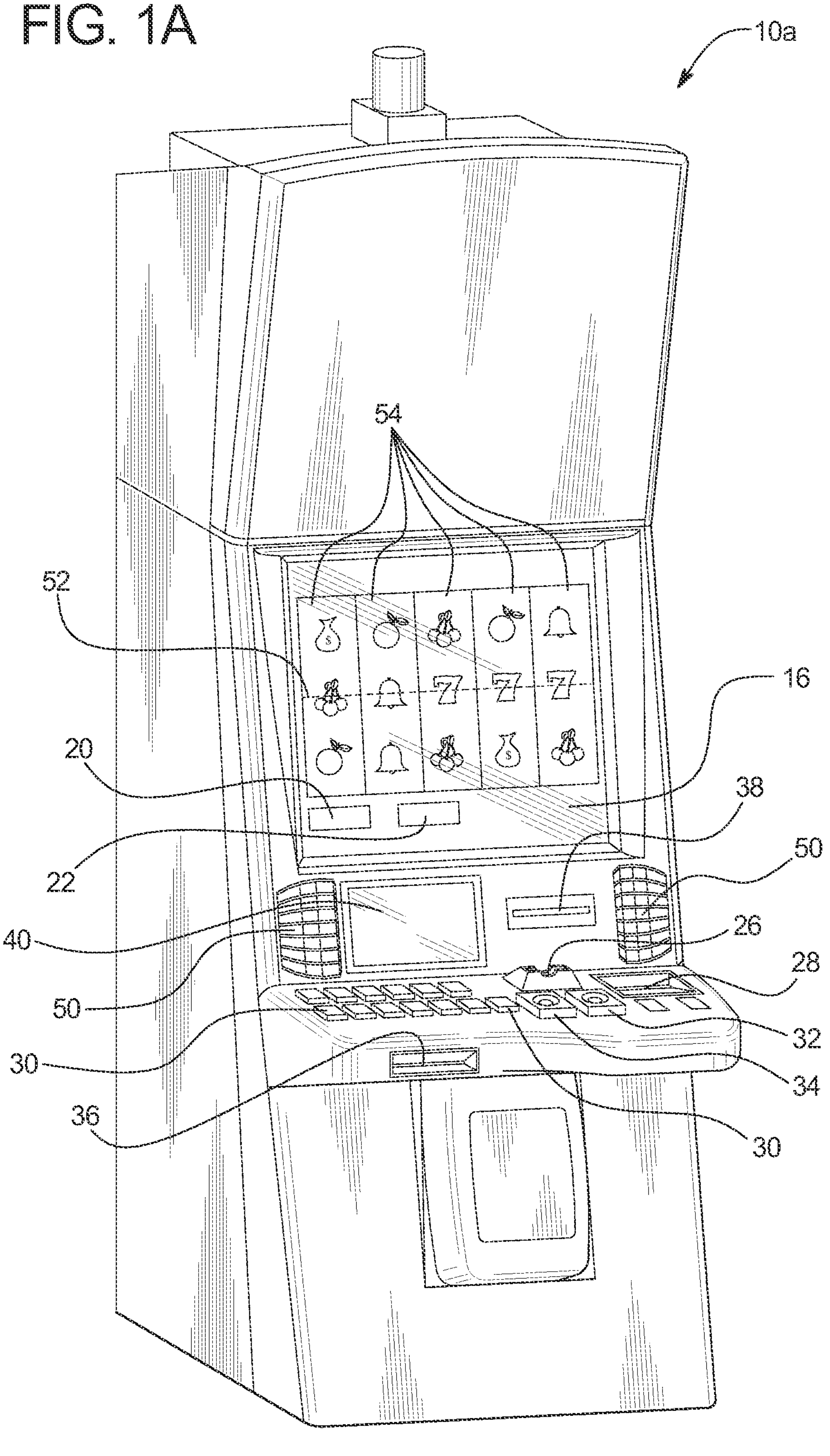
FIG. 1A is a front-side perspective view of one embodiment of the gaming device disclosed herein.
Figure 1B:
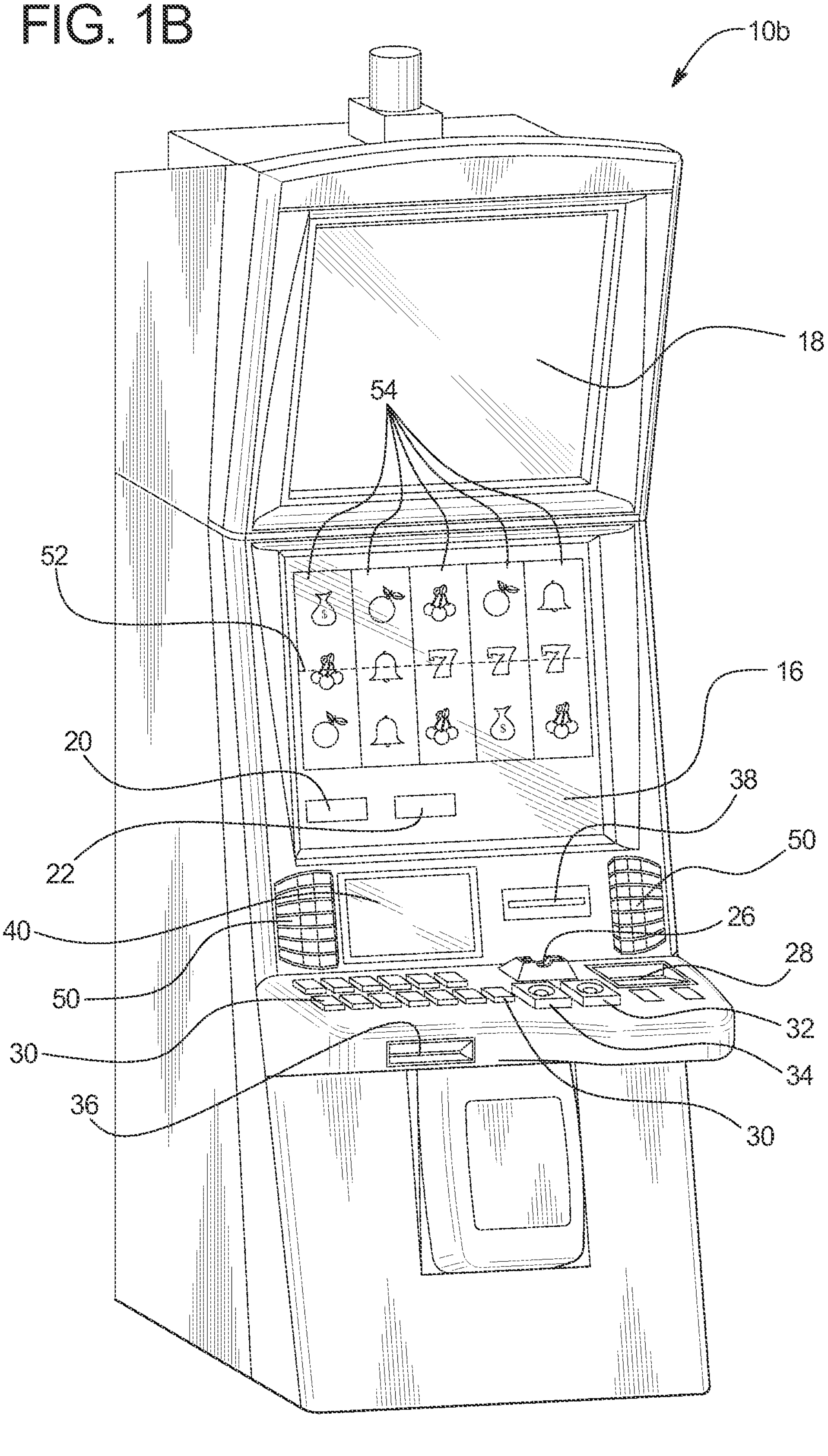
FIG. 1B is a front-side perspective view of another embodiment of the gaming device disclosed herein.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
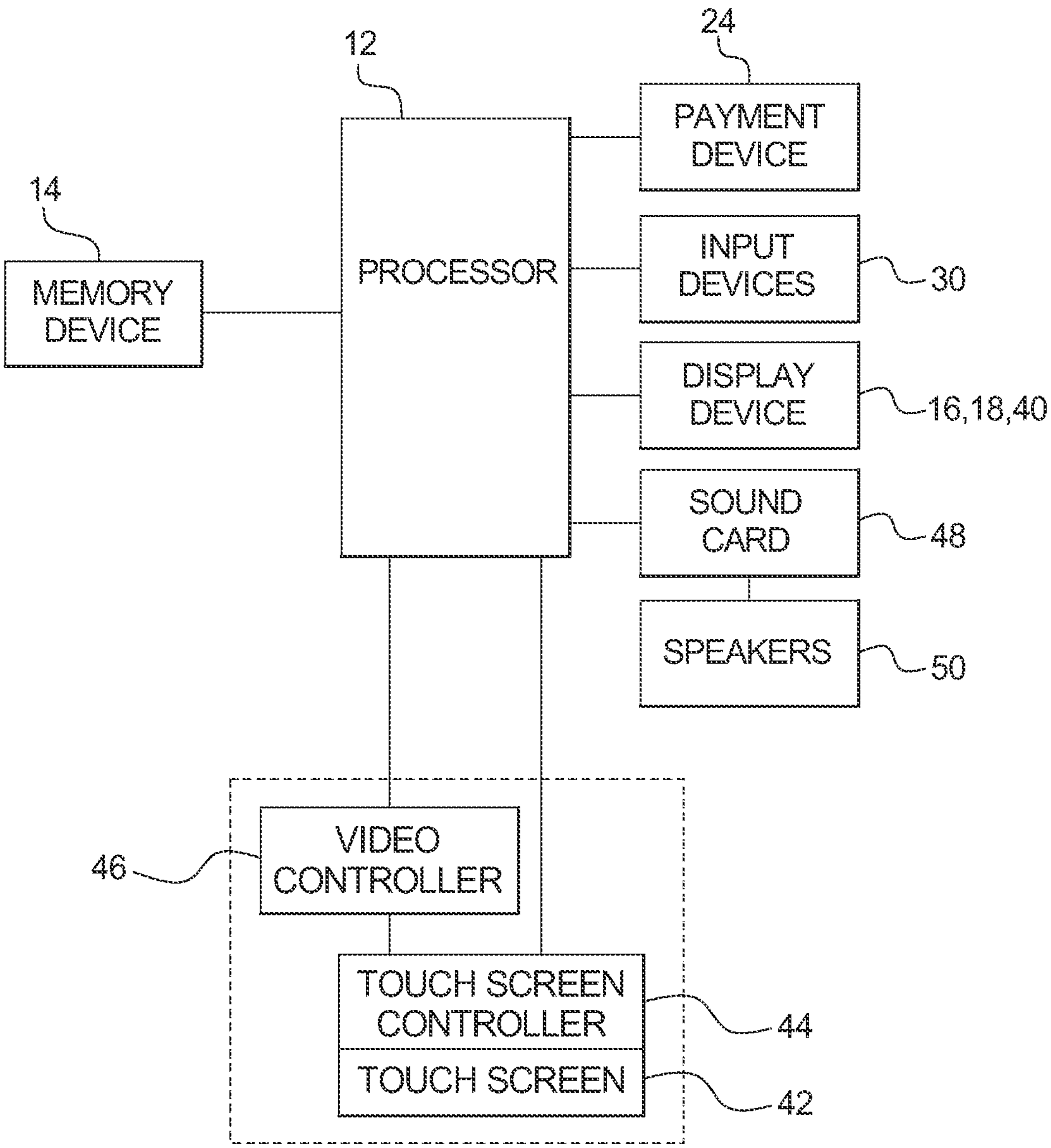
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a “computer” or “controller.”

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player’s current number of credits, cash, account balance, or the equivalent. In one embodiment, the gaming device includes a bet display 22 which displays a player’s amount wagered. In one embodiment, as described in more detail below, the gaming device includes a player tracking display 40 which displays information regarding a player’s play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. In one embodiment, the disclosed multi-dimensional cascading symbol game is implemented as a base or primary game.

In one embodiment, as illustrated in FIGS. 1A and 1B, a base or primary game may be a slot game with one or more paylines 52. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player.

In one embodiment, one or more of the paylines may be horizontal, vertical, circular, diagonal, angled or any combination thereof. In another embodiment, one or more of the paylines each include a plurality of adjacent symbol display positions on a requisite number of adjacent reels. In one such embodiment, one or more paylines are formed between at least two symbol display positions which are adjacent to each other by either sharing a common side or sharing a common corner (i.e., such paylines are connected paylines). In these embodiments, the gaming device enables a player to wager on one or more of such paylines to activate such wagered on paylines.

In another embodiment wherein one or more paylines are formed between at least two symbol display positions which are adjacent to each other, the gaming device enables a player to wager on and thus activate a plurality of symbol display positions. In this embodiment, one or more paylines which are formed from a plurality of adjacent active symbol display positions on a requisite number of adjacent reels are activated.

In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the gaming device enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of gaming machine enables a player to wager on one, more than one or all of the reels and the processor of the gaming device uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol display position on a first reel forms part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. In one embodiment, the disclosed multi-dimensional cascading symbol game is implemented as a bonus or secondary game. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
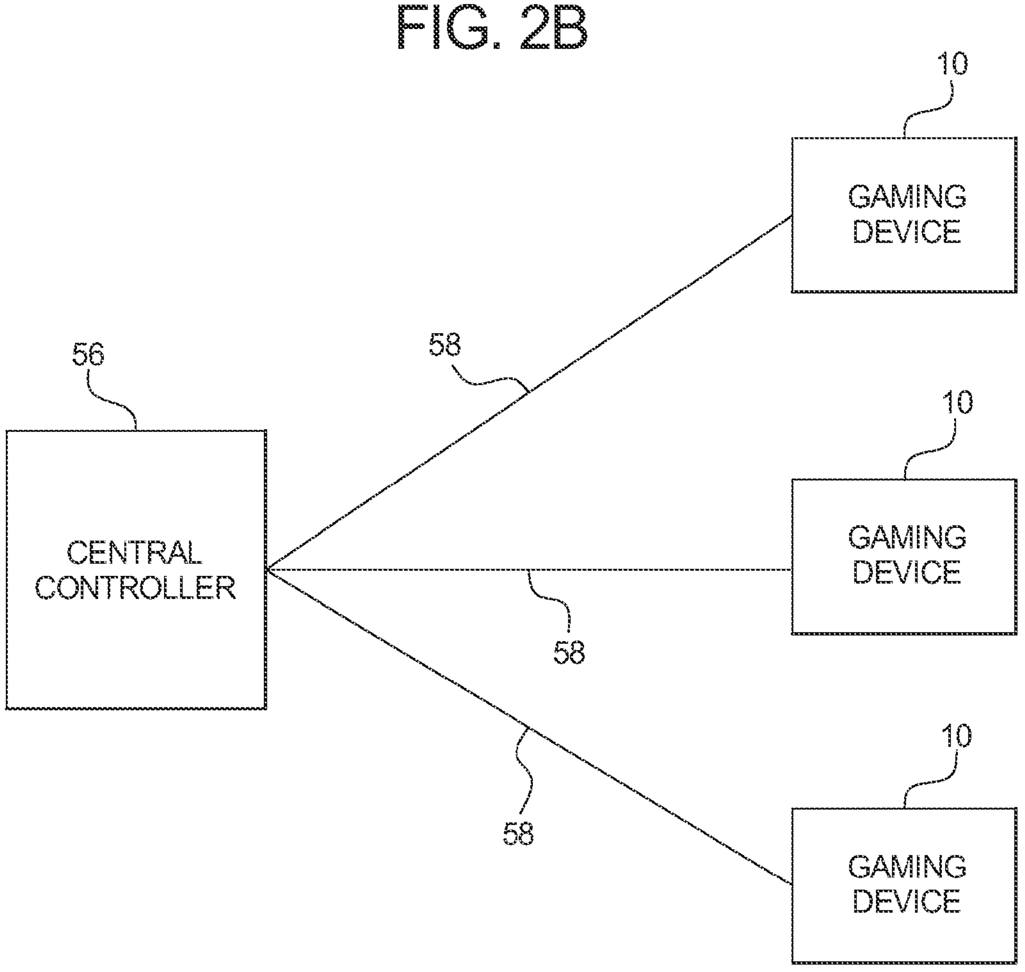
FIG. 2B is a schematic block diagram illustrating a plurality of gaming devices in communication with a central controller.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards.

In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multiple Game Bonusing Environment

Figure 3:
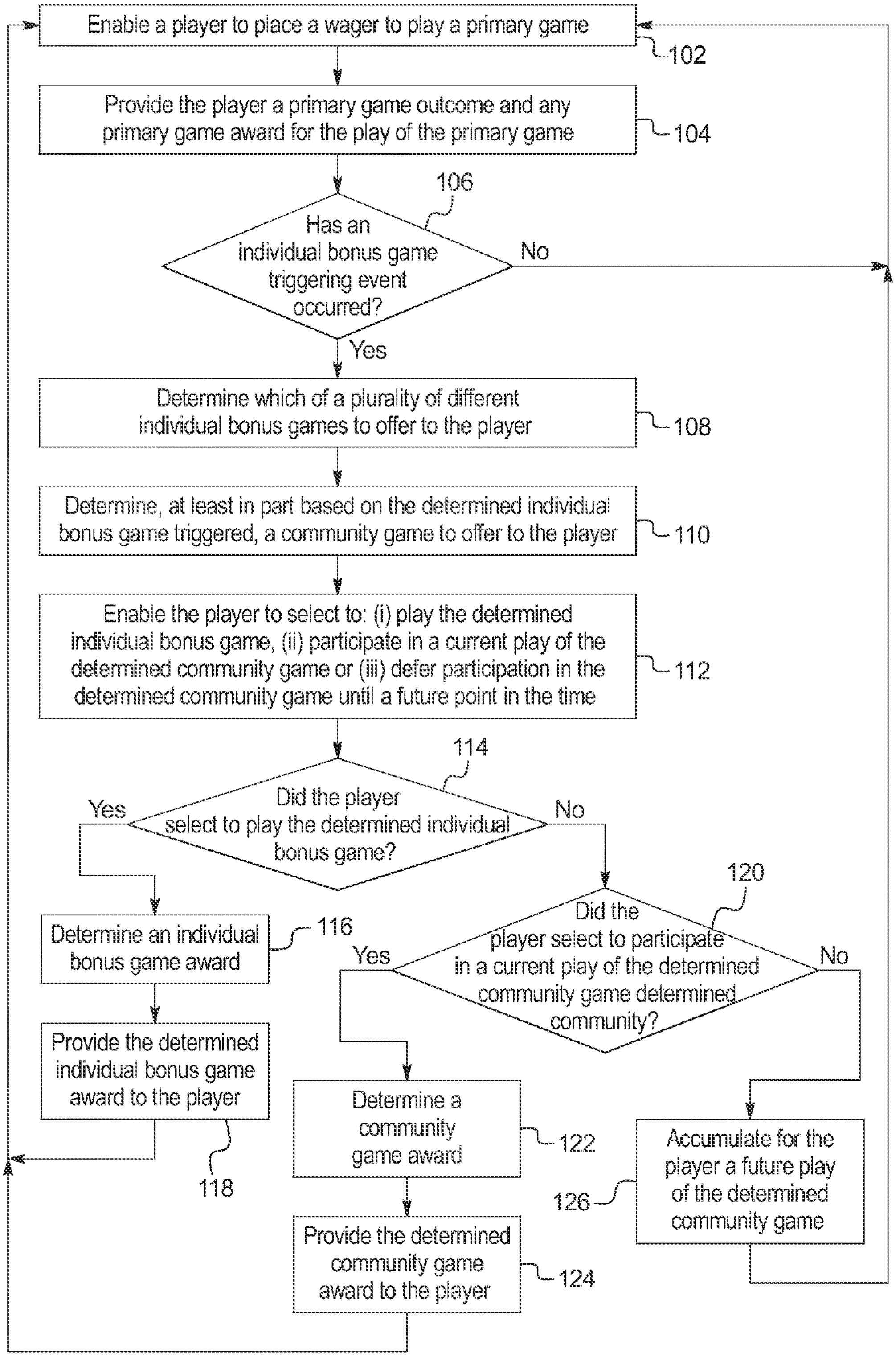
FIG. 3 is a flowchart of one embodiment of the gaming system herein disclosed illustrating a determination of whether to play a determined individual bonus game, play a community game or defer the play of the community game.

Referring now to FIG. 3, a flowchart of an example embodiment of a process for operating a gaming system, a gaming server or a gaming device disclosed herein is illustrated. In one embodiment, this process is embodied in one or more software programs stored in one or more memories and executed by one or more processors or one or more servers. Although this process is described with reference to the flowchart illustrated in FIG. 3, it should be appreciated that many other methods of performing the acts associated with this process may be used. For example, the order of certain steps described may be changed, or certain steps described may be optional.

As seen in FIG. 3, as described above, the gaming system and method disclosed herein enables a player to place a wager to play a primary or base game at one of the gaming devices as indicated in block 102. In this embodiment, the gaming device provides the player a primary game outcome and any primary game award for the play of the primary game as indicated in block 104. It should be appreciated that any suitable primary or base game disclosed herein (such as the primary games described above or otherwise known) may be implemented in accordance with the gaming system disclosed herein.

In one embodiment, the gaming system determines if an individual bonus game triggering event occurs as indicated in diamond 106. In one embodiment, the individual bonus game triggering event occurs in association with the displayed primary or base game. That is, the gaming system designates one or more displayed events or outcomes, such as a designated triggering symbol or triggering symbol combination, which occur in association with the displayed primary game (i.e., a symbol-driven event) and cause the gaming device to trigger an individual bonus game. In another embodiment, the individual bonus game triggering event occurs independent of any displayed event in the play of the primary game. That is, the gaming system designates one or more events which are not displayed in any play of any game (i.e., a mystery event) and cause the gaming device to trigger a bonus game. In another embodiment, an individual bonus game triggering event occurs at least partially based on a game triggered or symbol triggered event, such as at least partially based on a play of a primary game.

If the individual bonus game triggering event does not occur, the gaming system returns to block 102 and enables the player to place another wager for another play of the primary game as described above.

On the other hand, if the individual bonus game triggering event occurred, the gaming system determines which of a plurality of different individual bonus games to offer to the player as indicated in block 108 of FIG. 3. In one embodiment, different individual bonus games include different attributes, parameters or features and thus different individual bonus games have different average expected payouts.

Figure 4A:
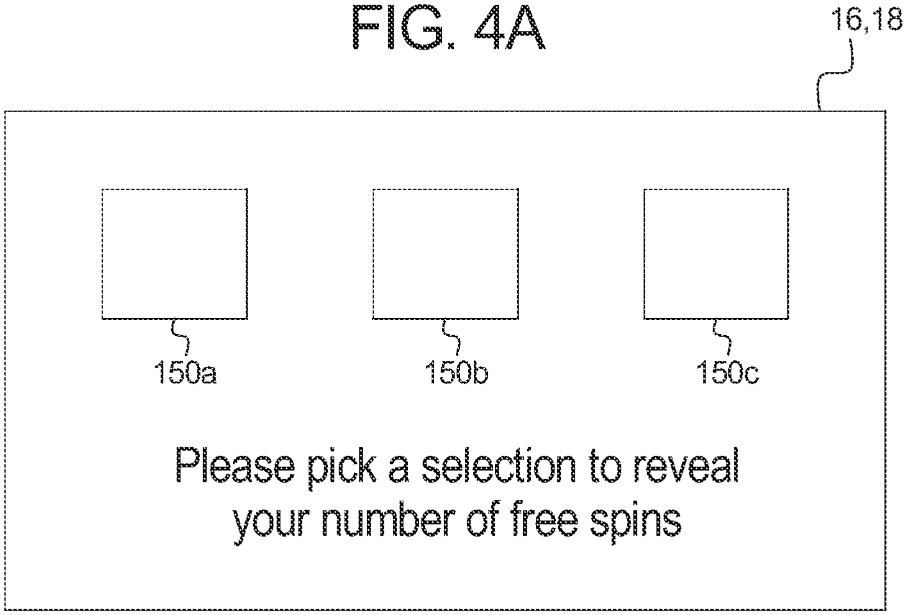
FIGS. 4A, 4B, 4C and 4D are front views of one example of game play screens of a gaming device disclosed herein illustrating a determination of whether to play a determined individual bonus game, play a community game or defer the play of the community game.
Figure 4B:
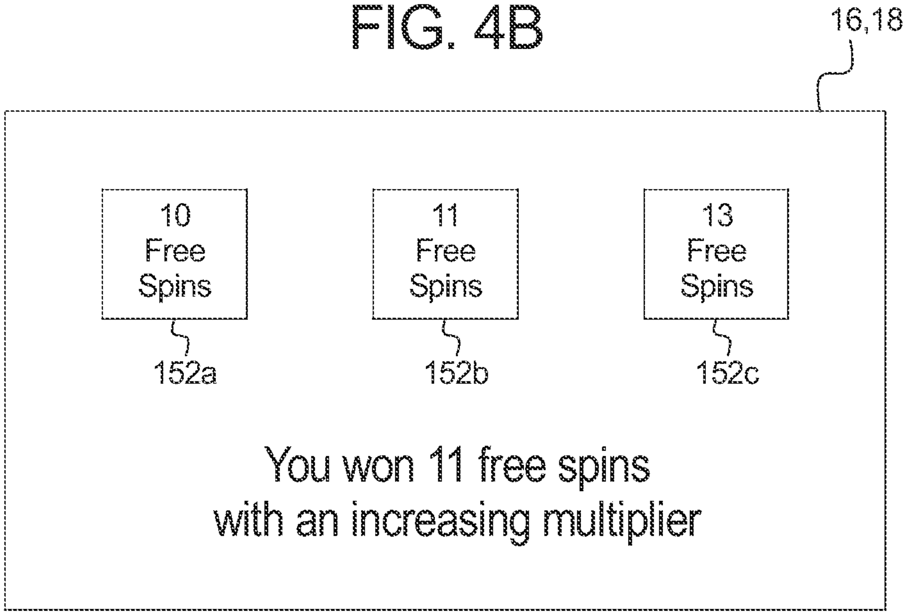

In one example, as seen in FIG. 4A, the gaming system determines which of a plurality of different individual bonus games to offer to the player based on a player's pick of one of a plurality of different masked selections 150*a*, 150*b*, and 150*c* that are each associated with a different individual bonus game In this example, as seen in FIG. 4B, the player picked selection 150*b* which is associated with an individual bonus game of eleven free spins with an increasing multiplier 152*b*. It should be appreciated that because each of the different available individual bonus games of this example have different quantities of free spins of the same underlying game, each of the different available bonus games of this example have different average expected payouts. That is, compared to the individual bonus game of ten free spins 152*a*, the individual bonus game of thirteen free spins 152*c* includes three more free spins (i.e., three more free chances to win an award) and thus the individual bonus game of thirteen free spins has a greater average expected payout than the individual bonus game of ten free spins.

Figure 4C:
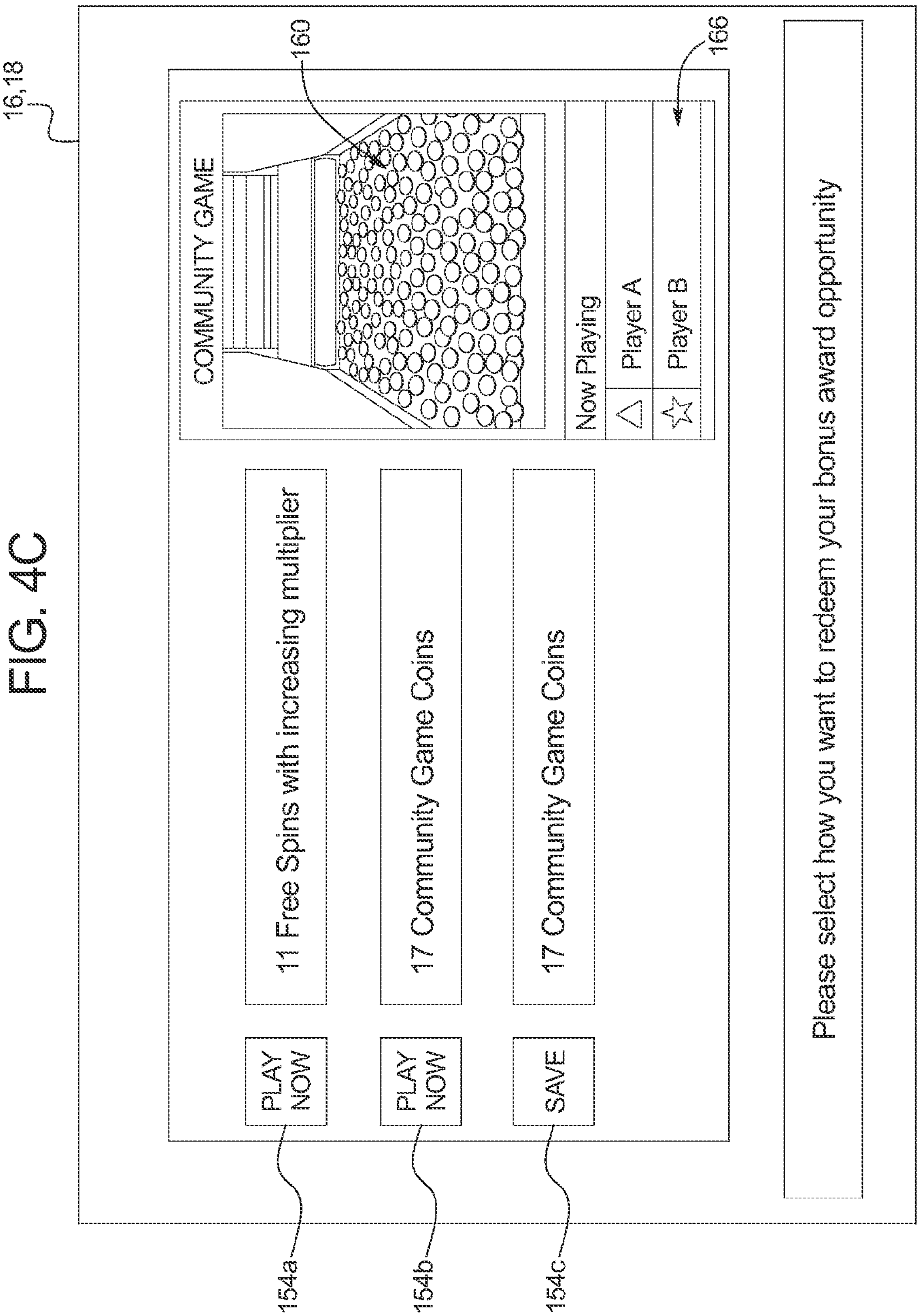

After determining the individual bonus game to offer to the player, the gaming system determines, at least in part based on the determined individual bonus game triggered, a community game to offer to the player as indicated in block 110 of FIG. 3. For example, as seen in FIG. 4C, after determining that the individual bonus game to offer to the player includes eleven free spins with an increasing multiplier, the gaming system determines that this determined individual bonus game equates to seventeen coins or tokens in a coin pusher community game.

More specifically, the gaming system determines one or more attributes, parameters or features of a community game to offer to the player, wherein this determination is based at least in part on the attributes, parameters or features of the determined individual bonus game. That is, to account for different gaming devices in the gaming system offering different individual bonus games with different attributes, parameters or features, for each individual bonus game offered to a player, one or more determined attributes, parameters or features of the community game are based on the specific configuration of the individual bonus game offered to the player. Put differently, the gaming system determines, based at least in part on the average expected payout (and/or award volatility) of the determined individual bonus game, a configuration of the community game such that the average expected payout (and/or award volatility) of the player's participation in the determined community game approximately corresponds to (or at least partially corresponds to) the average expected payout (and/or award volatility) of the play of the determined individual bonus game. It should thus be appreciated that as a player may be playing at and thus utilizing any suitable paytable of any suitable gaming device in the gaming system, in determining one or more attributes, parameters or features of a community game to offer to the player, the gaming system accounts for at least the paytable of the specific individual bonus game associated with each gaming device, including the average expected payout of such individual bonus games. Such considerations enable the gaming system disclosed herein to equate the individual bonus games offered by different gaming devices to provide equality to players offered different individual bonus games at such different gaming devices.

For example, if: (i) a first individual bonus game offered to a first player at a first gaming device has an average expected payout of $50, and (ii) a second individual bonus game offered to a second player at a second gaming device has an average expected payout of $100; then to equate the different average expected payouts of the different individual bonus games associated with each of these gaming devices, the gaming system offers the first and second players plays of a community game utilizing different attributes, parameters or features. In this example, the gaming system configures: (i) one or more attributes, parameters or features of the first player's play of the community game such that the first player's play of the community game has an average expected payout of approximately $50, and (ii) one or more attributes, parameters or features of the second player's play of the community game such that the second player's play of the community game has an average expected payout of approximately $100. It should be appreciated that in this example, the first player and the second player may have the same expected payout (in terms of credit) if the bet denomination of the player is twice that of the first player.

After determining the configuration of the community game to offer to the player, the gaming system enables the player to select to: (i) play the determined individual bonus game, (ii) participate in a current play of the determined community game, or (iii) defer participation in the determined community game until a future point in time as indicated in block 112 of FIG. 3. For example, as seen in FIG. 4C, the gaming system enables the player to pick to: (i) play the individual bonus game of eleven free spins with an increasing multiplier 154*a*, (ii) play the coin pusher community game with seventeen coins 154*b*, or (iii) defer the play of the coin pusher community game with seventeen coins 154*c*.

It should be appreciated that rather than automatically providing the player the determined individual bonus game and/or the determined community game, the gaming system disclosed herein enables the player to decide whether they want to play the determined individual bonus game now, play the determined community game now or play the determined community game later. Put differently, the gaming system disclosed herein enables a player to convert the native value of a triggered individual bonus game into a form of currency that is redeemable at a later point in time in association with one or more community games. Such a configuration provides an increased level of excitement and entertainment as player's must decide whether to participate in an individual bonus game or participate in a community game.

After enabling the player to select the form in which the triggered award opportunity will be provided to the player, the gaming system determines if the player selected to play the determined individual bonus game as indicated in diamond 114 of FIG. 3. If the player selected to play the determined individual bonus game, the gaming system determines an individual bonus game award for the play of the individual bonus game as indicated in block 116. The gaming system then provides the determined individual bonus game award to the player as indicated in block 118 and returns to block 102 to enable the player to place another wager for another If should be appreciated that if the player selects to play the determined individual bonus game, the player forgoes or otherwise forfeits the play of the determined community game (and thus forgoes or otherwise forfeits any awards associated with the play of the determined community game).

On the other hand, if the player selected not to play the determined individual bonus game, the gaming system determines if the player selected to play the determined community game as indicated in diamond 120. If the player selected to play the determined community game (i.e., the player selected to participate in a current play of the determined community game), the gaming system determines a community game award for the player for the play of the individual bonus game as indicated in block 122. The gaming system then provides the determined community game award to the player as indicated in block 124 and returns to block 102 to enable the player to place another wager for another play of the primary game as described above. If the player selects to play the determined community game, the player forgoes or otherwise forfeits the play of the determined individual bonus game (and thus forgoes or otherwise forfeits any awards associated with the play of the determined individual bonus game).

On the other hand, if the player selected not to play either the determined individual bonus game or participate in a current play of the determined community game, the gaming system accumulates for the player a future play of the determined community game as indicated in block 126. That is, the gaming system enables the player to bank, save, hold or accumulate such an entry (or a plurality of entries) into the community game until the player decides to selectively enter and play the determined community game. For example, as seen in FIG. 4C, if the player elects to defer the play of the coin pusher community game, the gaming system accumulates seventeen coins for the player. In one example embodiment, these seventeen coins are associated with one community game entry. In another example embodiment, these seventeen coins are associated with seventeen community game entries.

After accumulating any community game entries for the deferred play of the community game, the gaming system returns to block 102 to enable the player to place another wager for another play of the primary game as described above. If the player selects to defer a play of the determined community game, the player: (i) forgoes or otherwise forfeits the play of the determined individual bonus game (and thus forgoes or otherwise forfeits any awards associated with the play of the determined individual bonus game), and (ii) forgoes or otherwise forfeits a current play of the determined community game (and thus forgoes or otherwise forfeits any awards associated with the current play of the determined community game).

It should be appreciated that when the player decides to subsequently enter a community game, the gaming system provides the player with a play of the community game utilizing the previously determined attributes, parameters or features of the community game. For example, if the player picks selection 154*c* of FIG. 4C and defers participation in the coin pusher community game, when the player subsequently decides to participate in the coin pusher community game, such as when the player believes there is an increased chance of winning an award, the gaming system enables the player to utilize the seventeen coins saved in association with the deferment of this community game. Such a configuration thus provides an increased level of excitement and entertainment as player's must decide whether to currently redeem their entry into the community game or wait to redeem their entry into the community game when the conditions for winning an award could be more or less favorable for the player. That is, such a configuration enables a player to determine, based on such factors as: a player's feeling of luck, a player's current credit balance, a player wanting to play with one or more other players, a player wanting to play a community game by themselves, a quantity of other players currently playing the community game, which awards are currently available to be won in the community game and/or a player's assessment of their chances of winning valuable awards; whether they want to participate in a community game now or defer such participation until a later point in time. It should be appreciated that while a player of the coin pusher community game does not require the participation of other players for that player to succeed in the coin pusher community game, the play of the coin pusher community game by additional players presents a co-operative competition "co-opertition" aspect. That is, while participation by additional players might reduce a first player's share of the awards available in the coin pusher community game (i.e., an additional player wins one or more awards, thus causing such awards to be unavailable for the first player), such additional players might also accelerate the first player's ability to collect winnings (i.e., an additional player contributes additional coins to the coin pusher game which the first player may subsequently win).

It should be further appreciated that each accumulated community game entry has a theoretical value or average expected payout which is based on the average expected payout of the skipped individual bonus game. For example, if a player forgoes an individual bonus game with an average expected payout of $50 and the player accumulates one entry into a community game, that one accumulated entry has a theoretical value of $50. Such values are theoretical because prior to being utilized or otherwise redeemed in association with one or more community games, an actual value for such accumulated community game entries cannot be determined until one or more determinations occur in association with the utilization or redemption of such an accumulated community game entry. For example, if a player utilizes five accumulated community game entries (each with a theoretical value of $50) and is provided a total community game award of $500 dollars, then the actual value associated with each utilized community game entry is $100. Thus, the gaming system disclosed herein provides for the accumulation of community game entries that have a theoretical value or average expected payout prior to being utilized or redeemed and have an actual value after being utilized or redeemed, wherein the theoretical value and the actual value may differ.

Figure 4D:
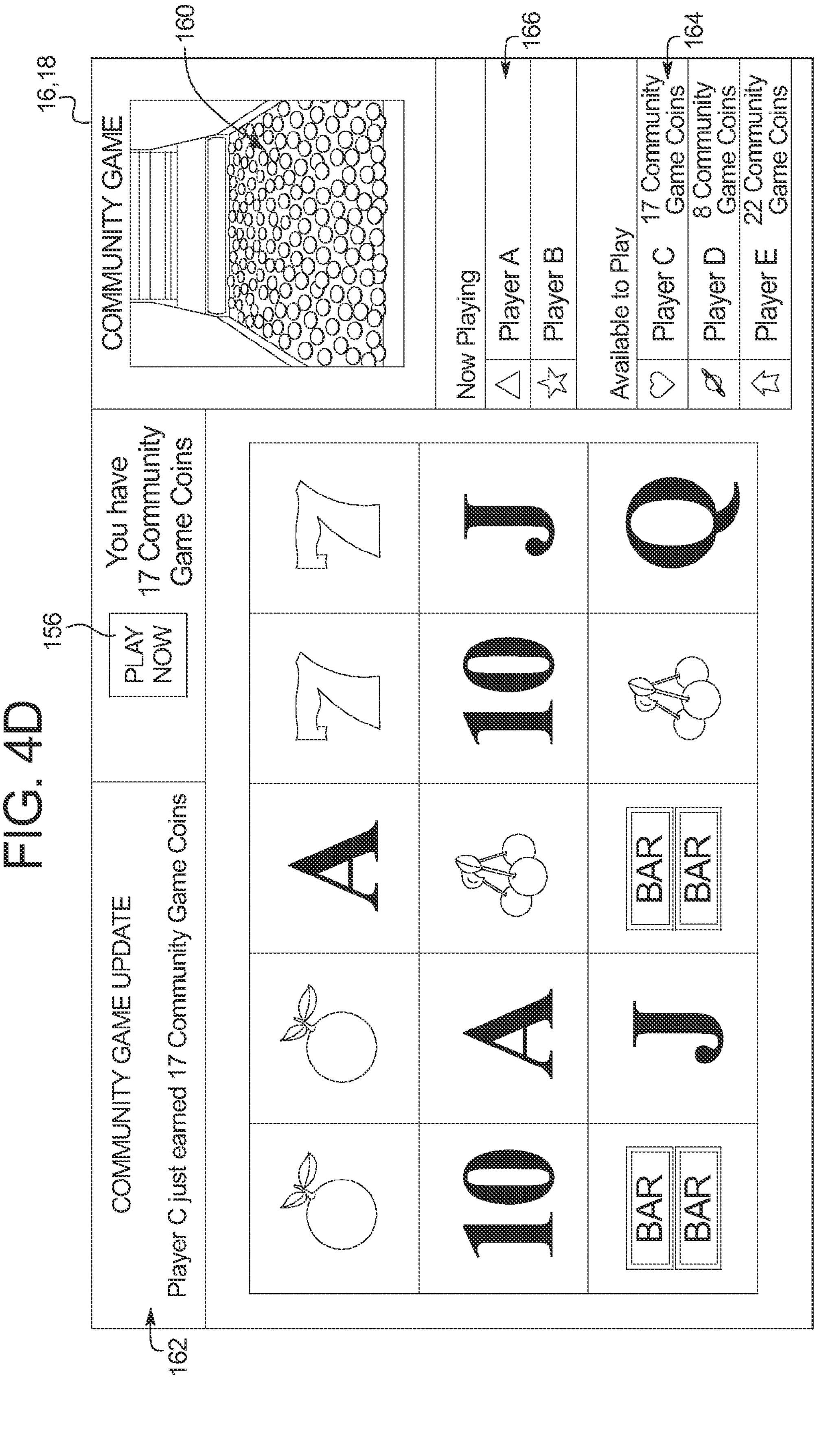

After accumulating one or more entries into the community game and returning to wagering on the primary game, the gaming system enables the player to selectively enter the deferred community game. For example, as seen in FIG. 4D, after returning to wager on another play of the primary game, the gaming system enables the player to utilize input 156 to selectively access any accumulated community game entries. That is, the gaming system enables the player to continue playing primary games, continue playing any offered individual bonus games and/or community games, and continue accumulating entries into one or more different community games until the player decides to redeem at least one of any accumulated entries and access at least one community game. When the player decides to enter and play the determined community game, the gaming system proceeds with enabling the player to participate in the play of the determined community game as described above.

Individual Bonus Games

In one embodiment, as described above, upon an individual bonus game triggering event occurring, the gaming system determines which of a plurality of different individual bonus games to offer to the player. In one embodiment, which individual bonus game to offer to the player is based, at least in part, on the individual bonus game triggering event which occurred. For example, if a first individual bonus game triggering event occurred, the gaming system offers the player an individual bonus game of five free spins of a game and if a second, different individual bonus game triggering event occurred, the gaming system offers the player an individual bonus game of seven free spins of the same game.

In another embodiment, which individual bonus game to offer to the player is based, at least in part, on at least one player input. For example, after an occurrence of an individual bonus game triggering event, the gaming system displays to the player a selection game including a plurality of masked selections. In this example, different masked selections are associated with different individual bonus games and the gaming system enables the player to pick one of the selections to determine which individual bonus game to offer the player.

In another embodiment, in addition to deferring a play of a determined community game, the gaming system enables the player to defer a play of the determined individual bonus game. In this embodiment, if the player selects to defer a play of a determined individual bonus game, the gaming system provides the player (or otherwise accumulates for the player) a quantity of individual bonus game entries. Similar to the community game entries described herein, the gaming system of this embodiment enables the player to selectively redeem such individual bonus game entries for one or more subsequent plays of one or more individual bonus games. In one such embodiment, the gaming system enables the player to elect to play an individual bonus game (and/or enter a community game) at any time. In another such embodiment, the gaming system enables the player to elect to play an individual bonus game (and/or enter a community game) upon triggering an individual bonus game entry event (and/or a community game entry event). In another such embodiment, the gaming system enables a player to play an individual bonus game (and/or enter a community game) at one or more designated times.

It should be appreciated that any suitable bonus game may be implemented as the individual bonus game offered to the player. In different embodiments, the individual bonus game offered to the player includes, but is not limited to: any suitable slot game, any suitable free spins or free activations game, any suitable wheel game, any suitable card game, any suitable offer and acceptance game, any suitable award ladder game, any suitable puzzle-type game, any suitable persistence game, any suitable selection game, any suitable cascading symbols game, any suitable ways to win game, any suitable scatter pay game, any suitable coin-pusher game, any suitable elimination game, any suitable stacked wilds game, any suitable trail game, any suitable bingo game, any suitable video scratch-off game, any suitable pick-until-complete game, any suitable shooting simulation game, any suitable racing game, any suitable promotional game, any suitable high-low game, any suitable lottery game, any suitable number selection game, any suitable dice game, any suitable skill game, any suitable auction game, any suitable reverse-auction game, any suitable group game or a play of any other suitable type of game.

In different embodiments, the attributes, parameters or features available for utilization in the play of the determined individual bonus game include, but are not limited to:

i. an applicable multiplier for the individual bonus game;
ii. a quantity of modifier symbols for the individual bonus game;
iii. a starting credit amount for the individual bonus game;
iv. a value associated with at least one of the symbols in the individual bonus game;
v. a value associated with at least one winning payline in the individual bonus game
vi. a quantity of picks in the individual bonus game;
vii. a quantity of selections in the individual bonus game;
viii. a quantity of wild symbols in the individual bonus game;
ix. a quantity of wild reels in the individual bonus game;
x. a quantity of retrigger symbols in the individual bonus game;
xi. a quantity of terminators or termination symbols in the individual bonus game;
xii. a quantity of anti-terminators in the individual bonus game;
xiii. a quantity of locking reels in the individual bonus game;
xiv. a quantity of locking symbol positions in the individual bonus game;
xv. a quantity of expanding symbols in the individual bonus game;
xvi. a quantity of award opportunities in the individual bonus game;
xvii. a quantity of progressive awards in the individual bonus game;
xviii. a range of available awards in the individual bonus game;
xix. a maximum award in the individual bonus game;
xx. a minimum award in the individual bonus game;
xxi. a quantity of active reels in the individual bonus game;
xxii. a quantity of active paylines in the individual bonus game;
xxiii. a quantity of offers in the individual bonus game;
xxiv. a paytable will be utilized in the individual bonus game;
xxv. a volatility of the individual bonus game;
xxvi. an average expected award in the individual bonus game;
xxvii. a quantity of hands of playing cards in the individual bonus game;
xxviii. a quantity of free spins in the individual bonus game;
xxix. a quantity of free activations in the individual bonus game;
xxx. a quantity of rounds or levels in the individual bonus game;
xxxi. any bonus game feature disclosed herein; and
xxxii. any other suitable individual bonus game feature.

Community Games

Figure 5:
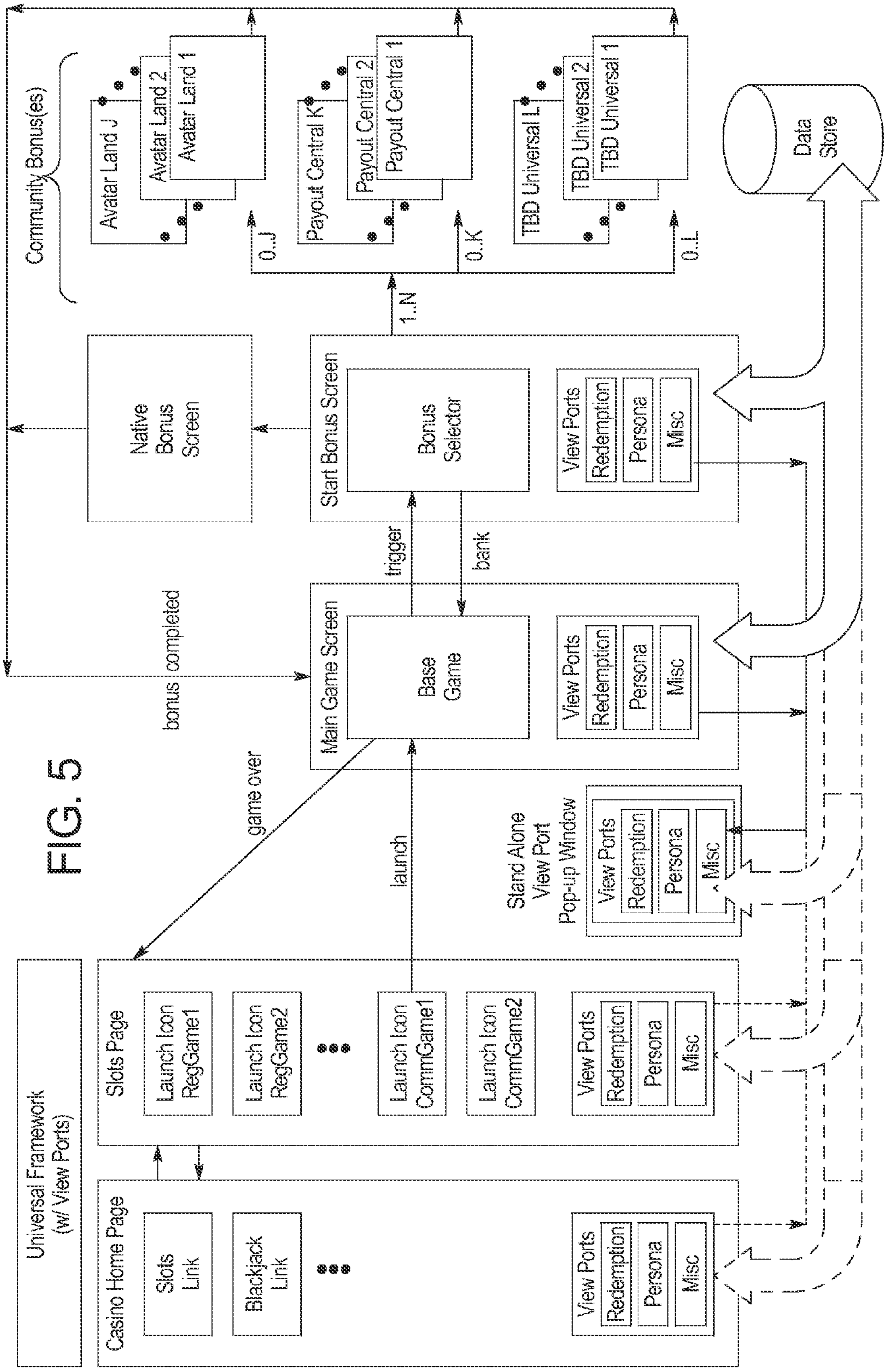
FIG. 5 is a schematic diagram of the framework of the primary games, the individual bonus games and the community games maintained by the gaming system.

In one embodiment, as described above, upon an individual bonus game triggering event occurring, in addition to determining which of a plurality of different individual bonus games to offer to the player, the gaming system determines, at least partially based on the determined individual bonus game, a community game to offer to the player. In one embodiment, the gaming system maintains one community game. In another embodiment, as seen in FIG. 5, the gaming system maintains a plurality of community games. In one such embodiment, a plurality of these community games are different. In another such embodiment, at least two of these community games are the same. In one embodiment, the awards available in two or more of these community games are the same. In another embodiment, the awards available in two or more of these community games are different.

In one embodiment in which the gaming system maintains a plurality of community games, each accumulated community game entry is redeemable in any type of community game (i.e., can be redeemed in association with any type of community game). In this embodiment, a player's accumulated community game entries are a form of currency which the player may redeem for any play of any available community game. For example, if a player accumulates a quantity of coins for a coin drop community game and the gaming system currently maintains a coin drop community game, a maze or trail community game and a selection community game, the gaming system enables the player to: (i) utilize their accumulated quantity of coins in the coin drop community game, (ii) convert their accumulated quantity of coins into a quantity of entries of the maze or trail community game and then utilize these entries in the maze or trail community game, or (iii) convert their accumulated quantity of coins into a quantity of picks of the selection community game and then utilize these picks in the selection community game.

In one such embodiment in which a player's accumulated community game entries may be redeemed for any play of any available community game, the gaming system accounts for the different community games having different configurations by converting different quantities of accumulated community game entries into different plays of different community games. That is, since different community games may have different awards available and/or different probabilities of winning such awards, the gaming system equitably determines at least part of a player's community game play based on the accumulated community game entries for the player and the different awards available and/or different probabilities of winning such awards in the community game the player selected to play. Utilizing the above example of the gaming system maintaining a coin drop community game, a maze or trail community game and a selection community game, if a player has previously accumulated seventeen coins for the coin drop community game, these seven coins may equate to three plays of the maze or trail community game or twenty-five picks in the selection community game.

In another embodiment in which the gaming system maintains a plurality of community games, each accumulated community game entry is specific to a particular type of community game (i.e., can only be redeemed in association with that type of community game). In this embodiment, the gaming system limits the player in which community games the player may select to redeem one, more or all of their accumulated community game entries. For example, if a player accumulates a quantity of coins for a coin drop community game and the gaming system currently maintains three different coin drop community games, the gaming system enables the player to utilize their accumulated quantity of coins in one or more of these coin drop community games. In one such example, if a player decides to utilize their accumulated coins in a first of the plurality of maintained coin drop community games, the gaming system requires the player to utilize all of their accumulated coins in this first coin drop community game. In another such example, if a player decides to utilize their accumulated coins in a first of the plurality of maintained coin drop community games, the gaming system enables the player to utilize one or more of their accumulated coins in this first coin drop community game and also utilize one or more of their accumulated coins in a second one of the plurality of maintained coin drop community games.

In another embodiment in which the gaming system maintains a plurality of community games, each accumulated community game entry is specific to a particular community game (i.e., can only be redeemed in association with that community game). For example, if a player accumulates a quantity of coins for a specific coin drop community game, despite the gaming system currently maintaining three different coin drop community games, the gaming system requires the player to utilize their accumulated quantity of coins in the specific coin drop community game.

In one embodiment, based on the quantity of player's currently participating in a maintained community game, the gaming system modifies the quantity of maintained community games. In this embodiment, the gaming system dynamically allocates gaming devices or players to groups or collections which are associated with different community games based on amounts of activity compared to one or more predefined allocation thresholds. For example, if an amount of player activity for a community game, such as a number of players currently participating in the community game, exceeds a first or upper community game reconfiguration threshold, the gaming system dynamically disassociates at least one player from the community game and associates any disassociated players with another community game. Such disassociating/reassociating of the number of players currently associated with a community game enables the gaming system to scale up the quantity of maintained community games based on the quantity of players playing at the gaming devices in the system.

Figure 6A:
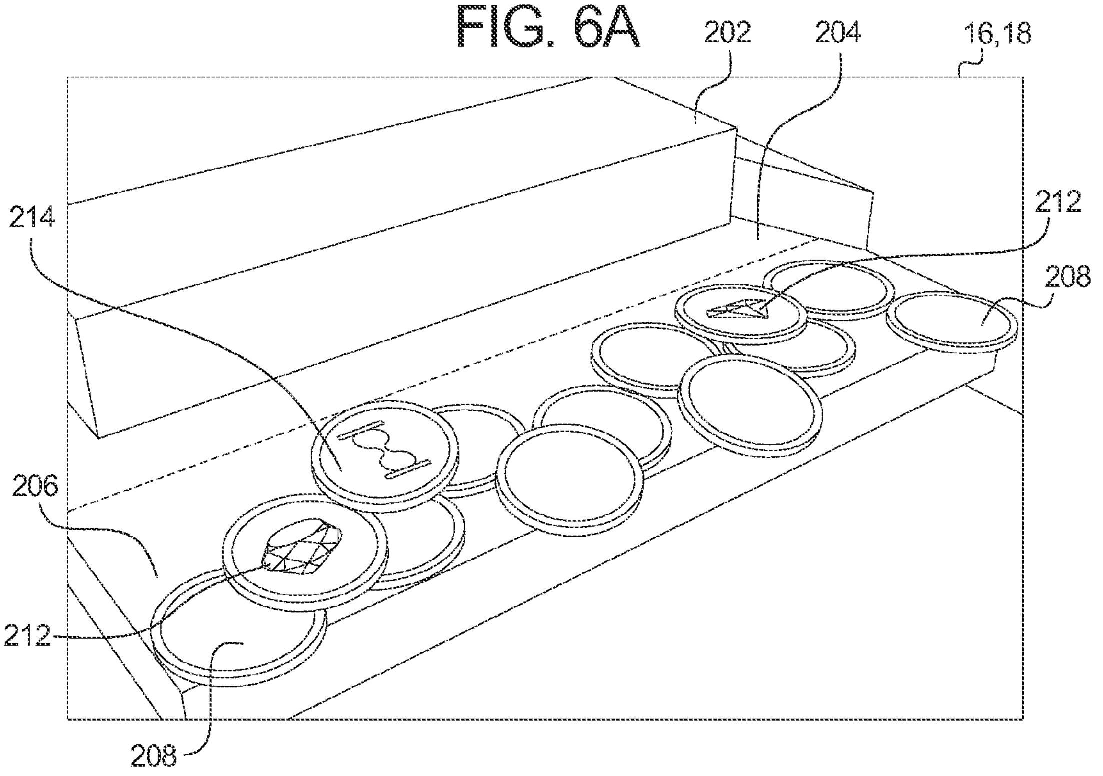
FIGS. 6A, 6B and 6C are different views of one example of game play screens of a gaming device disclosed herein illustrating a play of a coin pusher community game.
Figure 6B:
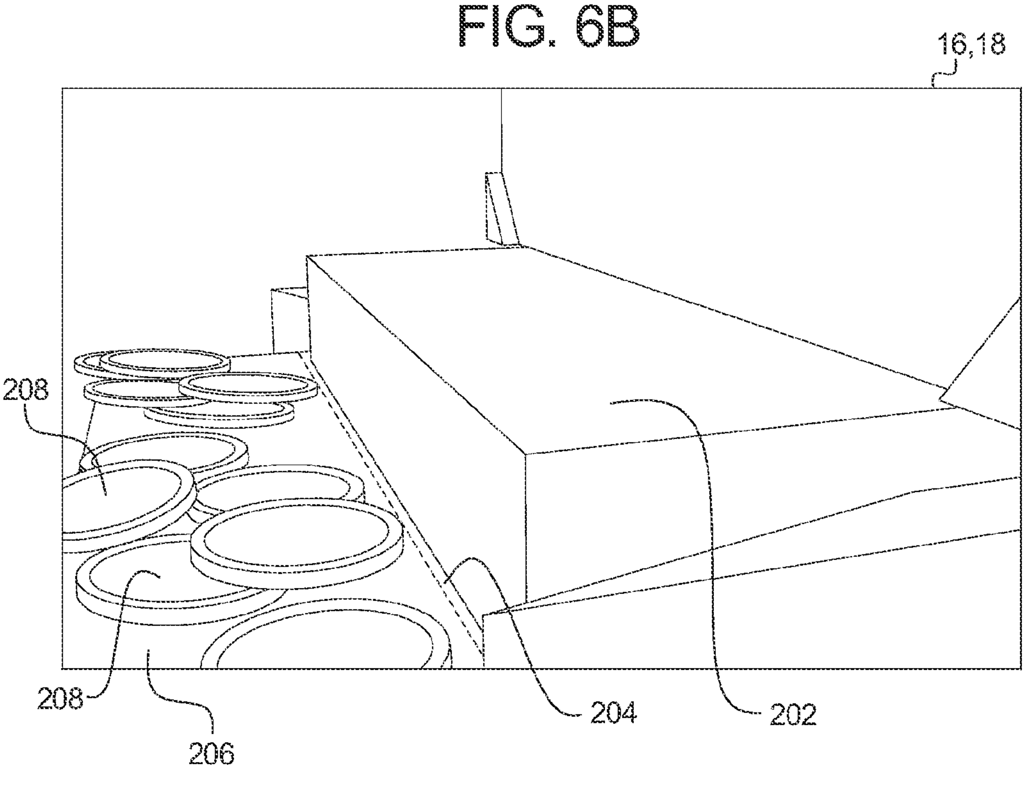
Figure 6C:
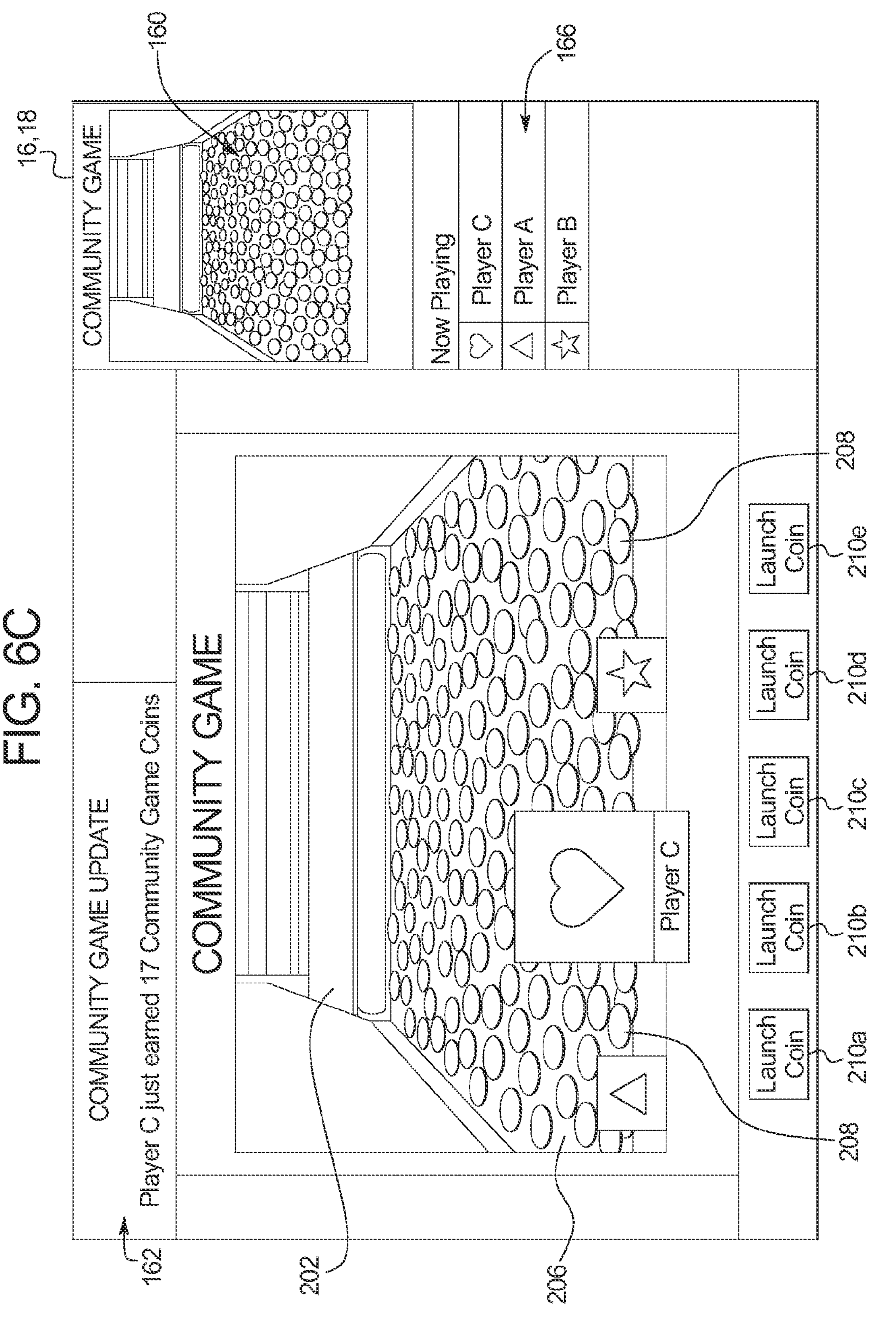

In one example embodiment, as mentioned above, the community game is a virtual or video multiple player coin pusher or coin drop game. For example, as seen in FIGS. 6A, 6B and 6C, this community game includes a virtual or video coin pusher or mover 202, a virtual or video coin engagement area 204, a virtual or video coin accumulation area 206 and a virtual or video coin collection area (not shown). For illustration purposes only, FIGS. 6A and 6B show a dotted line separating the coin engagement area 204 and the adjacent coin accumulation area 206. The gaming system displays the coin pusher or mover 202 oscillating or otherwise moving back and forth within the coin engagement area 204 (i.e., and not reaching the coin accumulation area 206).

In operation, when a player enters this community game with a quantity of virtual or video coins or tokens 208, the gaming system enables the player to place such coins or tokens in the coin engagement area (i.e., in front of and within the range of motion of the moving coin pusher). That is, the gaming system enables the player to place each coin at one of a plurality of different positions of the coin engagement area. As seen in FIG. 6C, the gaming system enables the player to select one of a plurality of different drop positions 210*a*, 210*b*, 210*c*, 210*d* and 210*e* to launch or drop a coin from into the coin engagement area.

After initially placing a coin in the coin engagement area, the gaming system then displays the coin pusher moving these coins or tokens to the coin accumulation area. After the gaming system has moved a certain quantity of coins or tokens to the coin accumulation area (or a portion of the coin accumulation area), the subsequent movement of one or more coins or tokens from the coin engagement area to the coin accumulation area causes zero, one or more other coins or tokens to be pushed off the coin accumulation area and into the coin collection area. Any awards associated with any coins or tokens pushed into the coin collection area are provided to one or more players. For example, if: (i) the player with seventeen coins decides to place one of their coins in the coin engagement area, (ii) the movement of the coin pusher causes this placed coin to move from the coin engagement area to the coin accumulation area, and (iii) the movement of this placed coin to the coin accumulation area causes another coin associated with an award of $10 to move from the coin accumulation area to the coin collection area; the player is provided an award of $10 and enabled to place another one of any remaining coins in the coin engagement area.

It should be appreciated that because this multiple player coin pusher game includes different coins and different quantities of coins accumulating in the coin accumulation area at different points in time, player's are faced with an exciting decision regarding when to enter this community game (i.e., when to utilize any saved coins in this coin pusher game). For example, if a player is aware that an increased quantity of coins have accumulated in the coin accumulation area (or one or more coins associated with lucrative awards are near being pushed into the coin collection area), the player may decide to enter this community game and/or increase their rate of play in attempt to accumulate additional coins for this community game. That is, in certain situations, a player may alter their play of the primary game in response to the current configuration or status of the community game.

In one embodiment, each coin utilized in this community game is initially placed in the coin engagement area. This embodiment provides that each coin will come into contact with and be moved by the coin pusher (and thus may contact one or more other coins previously located in the coin accumulation area). In another embodiment, one or more coins utilized in this community game are initially placed in the coin accumulation area. In this embodiment, since the coin pusher does not directly contact any coins in the coin accumulation area, the initial placement of a coin in the coin accumulation area will not cause the movement of any other coins as described herein.

In one embodiment, each of the coins is associated with an award, such as an award amount or value. In one such embodiment, a plurality of the coins are associated with a plurality of different awards. In another embodiment, at least one of the coins is not associated with any award.

In another embodiment, one or more of the coins are associated with an outcome, such as a modifier or multiplier. For example, as seen in FIG. 6A, the coin including gem 212 is associated with a multiplier of 3×. In this embodiment, if this coin is pushed into the coin collection area, the gaming system multiplier the awards associated with one or more previously or subsequently provided coins by a multiplier of 3×. In another embodiment, as also seen in FIG. 6A, one or more of the coins 214 are associated with a finite duration, such as an amount of time or a quantity of coin tries. In this embodiment, if such a coin is not provided to the player within the finite duration associated with that coin, the gaming system causes this coin to disappear or otherwise lapse.

In one embodiment, the gaming system displays any award and/or outcome associated with each coin. In another embodiment, the gaming system displays the awards and/or outcomes associated with at least one of the coins and does not display (i.e., masks) the awards and/or outcomes associated with at least one of the coins. In another embodiment, the gaming system does not display any of the awards and/or outcomes associated with any of the coins.

It should be appreciated that because different players (or the same player) entering this multiple player coin pusher game at different points in time when different coins and/or different quantities of coins are accumulated in the coin accumulation area may experience the same community game with different average expected payouts, in one embodiment, the gaming system equates or substantially equates such differences to normalize the average expected payout for each coin played in this multiple player coin pusher game. In one such embodiment, the awards associated with one or more coins and/or one or more outcomes are variable amounts. In this embodiment, the amount associated with such coins and/or outcomes vary depending on such factors as the player's bet denomination, the player's bet size, how many coins the player entered this community game with, how many coins the player has used in this community game since last winning an award, how many coins the player has used in this community game since last winning a designated award, how many other players are currently playing this community game, and/or how valuable are the awards associated with the coins currently in the coin accumulation area. In another embodiment, certain of the coins are associated with a secondary prize after that coin is pushed into the coin collection area. In one such embodiment, the odds of winning this secondary prize are inversely proportional to the award value of the coin pushed into the coin collection area. In another such embodiment, the gaming system randomly places one or more coins in the coin accumulation area to increase the overall value of the coins available to be won in the community game.

In one embodiment, when a player selects to access the community game and places one or more coins in the coin engagement area, such coins (and any awards associated with such coins) become available to any player playing the community game. For example, if, in association with an occurrence of an individual bonus game triggering event, a player accumulates a coin associated with an award of $50 and the player decides to use that $50 coin in this community game, the $50 coin becomes available to be won by any player playing the community game. In another embodiment, to normalize the average expected payout for each coin played in this multiple player coin pusher game, the gaming system provides a player a portion of the award associated with any coin the player placed in the coin engagement area. In another embodiment, to normalize the average expected payout for each coin played in this multiple player coin pusher game, while at least one coin the player placed into the coin engagement area remains in the coin accumulation area (i.e., all of the player's placed coins have not been moved to the coin collection area), the gaming system provides a player a portion of each award associated with each coin pushed into the coin collection area.

In one embodiment, if a plurality of players are currently participating in this community game, the gaming system causes any awards associated with any coins pushed into the coin collection area to be split or divided amongst the players. In one such embodiment, any awards are split equally amongst the players. In another such embodiment, the splitting of any awards is based on the quantity of coins or tokens each player recently added to the community game. In another embodiment, if a plurality of players are currently participating in this community game, the gaming system causes any awards associated with any coins pushed into the coin collection area to be provided to one, more or each of the players (i.e., no awards are split). In one such embodiment, the gaming system provides any award associated with any coin pushed into the coin collection area to whichever player's coin last reached the coin payout are. In another embodiment, the coin collection area is divided into a plurality of sub-areas. In this embodiment, a player picks (or is otherwise assigned) a sub-area and any awards associated with any coins that are collected in that coin collection area are provided to the player.

In one embodiment, to prevent a player from lurking in the community game (i.e., waiting until a quantity of coins accumulate in the accumulation area before utilizing any of that player's accumulated coins), the gaming system causes one of the player's accumulated coins to be automatically dropped/launched/added at least every k seconds. In one such embodiment, the coin addition rate is predetermined. In another such embodiment, the player can add coins as quickly they wish, with only an upper bound on time intervals between coin additions. In this embodiment, if the gaming system causes a player's accumulated coin to be automatically placed into the community game, the gaming system utilizes the player's last drop position as where to automatically drop this coin from. In another embodiment, after a player's last accumulated coin is played into the community game, the gaming system employs an eligible collection period during which any awards provided in the community game are associated with (and subsequently provided to) the player. In one such embodiment, this eligible collection period is longer than the above-described k seconds between the automatic dropping of accumulated coins.

In one embodiment, as described herein, the gaming system enables a player to selectively redeem one or more accumulated community game entries at any point in time the player wants. In another embodiment, the gaming system enables a player to selectively redeem one or more accumulated community game entries during designation redemption periods of time. In another embodiment, the gaming system enables a player to selectively redeem one or more accumulated community game entries after an occurrence of a designation redemption event. In one such embodiment, a designated redemption event corresponds with an occurrence of an individual bonus game triggering event. In this embodiment, when the gaming system offers a player a play of an individual bonus game, a play of a community game or an accumulation of a quantity of community game entries, the gaming system also enables the player to redeem any previously accumulated community game entries.

In another embodiment, the gaming system provides the player an additional award if the player has accumulated a designated quantity of community game entries and/or the player has participated in a designated quantity of community games in a designated period of time. In one such embodiment, one or more of these additional awards are funded, at least in part, based on one or more player's wagers at the gaming devices in the gaming system. In another such embodiment, one or more of these additional awards are funded, at least in part, via a side-bet or side-wager which a player may make (and which may be tracked via a side-bet meter). In another such embodiment, one or more of these additional awards are funded, at least in part, via an amount provided by one or more marketing and/or advertising departments, such as a casino's marketing department.

It should be appreciated that any suitable game may be implemented as the community game offered to the player. In different embodiments, the community game offered to the player includes, but is not limited to: any suitable slot game, any suitable free spins or free activations game, any suitable wheel game, any suitable card game, any suitable offer and acceptance game, any suitable award ladder game, any suitable puzzle-type game, any suitable persistence game, any suitable selection game, any suitable cascading symbols game, any suitable ways to win game, any suitable scatter pay game, any suitable coin-pusher game, any suitable elimination game, any suitable stacked wilds game, any suitable trail game, any suitable bingo game, any suitable video scratch-off game, any suitable pick-until-complete game, any suitable shooting simulation game, any suitable racing game, any suitable promotional game, any suitable high-low game, any suitable lottery game, any suitable number selection game, any suitable dice game, any suitable skill game, any suitable auction game, any suitable reverse-auction game, any suitable group game or a play of any other suitable type of game.

In different embodiments, the attributes, parameters or features available for utilization in the play of the determined community game include, but are not limited to:

i. an applicable multiplier for the community game;
ii. a quantity of modifier symbols for the community game;
iii. a starting credit amount for the community game;
iv. a value associated with at least one of the symbols in the community game;
v. a value associated with at least one winning payline in the community game
vi. a quantity of picks in the community game;
vii. a quantity of selections in the community game;
viii. a quantity of wild symbols in the community game;
ix. a quantity of wild reels in the community game;
x. a quantity of retrigger symbols in the community game;
xi. a quantity of terminators or termination symbols in the community game;
xii. a quantity of anti-terminators in the community game;
xiii. a quantity of locking reels in the community game;
xiv. a quantity of locking symbol positions in the community game;
xv. a quantity of expanding symbols in the community game;
xvi. a quantity of award opportunities in the community game;
xvii. a quantity of progressive awards in the community game;
xviii. a range of available awards in the community game;
xix. a maximum award in the community game;
xx. a minimum award in the community game;
xxi. a quantity of active reels in the community game;
xxii. a quantity of active paylines in the community game;
xxiii. a quantity of offers in the community game;
xxiv. a paytable will be utilized in the community game;
xxv. a volatility of the community game;
xxvi. an average expected award in the community game;
xxvii. a quantity of hands of playing cards in the community game;
xxviii. a quantity of free spins in the community game;
xxix. a quantity of free activations in the community game;
xxx. a quantity of rounds or levels in the community game;
xxxi. any community game feature disclosed herein; and
xxxii. any other suitable community game feature.

In various embodiments, the players for a community game include one or more of: (i) players playing gaming devices at a gaming establishment, (ii) players playing wagering games online or via a mobile device, and/or (iii) players playing non-wagering games online or via a mobile device. In another embodiment, one or more players participating in a community game are system controlled or internet gaming bots programmed to play the community game. In one such embodiment, such bots provide that a plurality of participants are participating in the community game when there are fewer live players, such as during off-peak times.

Information Provided to Players

As indicated above, using any suitable audio, audio-visual or visual devices, the gaming system provides information to one or more players and/or one or more bystanders regarding the above-described primary games, the above-described individual bonus games, the above-described community games and/or the above-described deferrals of any community games.

In one such embodiment, any suitable information about any primary games, any individual bonus games, any community games and/or any accumulated community game entries is provided to the players (and/or bystanders) through one or more displays on one or more of the gaming devices. In another embodiment, any suitable information about any primary games, any individual bonus games, any community games and/or any accumulated community game entries is alternatively or additionally provided to the players (and/or bystanders) through one or more displays positioned near the gaming devices, such as one or more community display devices. In another embodiment, any suitable information about any primary games, any individual bonus games, any community games and/or any accumulated community game entries is alternatively or additionally provided to the players (and/or bystanders) through one or more service windows, such as the service windows described in U.S. Published Patent Application No. 2007/0243934, U.S. Published Patent Application No. 2007/0243928, U.S. Published Patent Application No. 2008/0009344, U.S. Published Patent Application No. 2009/0104954, and/or U.S. Published Patent Application No. 2009/0233705. In another embodiment, any suitable information about any primary games, any individual bonus games, any community games and/or any accumulated community game entries is alternatively or additionally provided to the players (and/or bystanders) through one or more internet web browsers. In another embodiment, any suitable information about any primary games, any individual bonus games, any community games and/or any accumulated community game entries is alternatively or additionally provided to the players (and/or bystanders) through one or more RSS feeds.

In one embodiment, the gaming system switches the game focus based on which game is currently being played by the player. In one such embodiment, the gaming system swaps the display location of a primary game and the community game. For example, the gaming system causes a primary display device to display the community game if the community game becomes more interesting to the player (e.g., the player elects to participate in a play of the community game). In another such embodiment, the gaming system allocates a greater percentage of a display device to which game is currently being played by the player. In different embodiments, the gaming system utilizes one or more service windows and/or one or more pop-up windows to display such information to the player.

Figure 7:
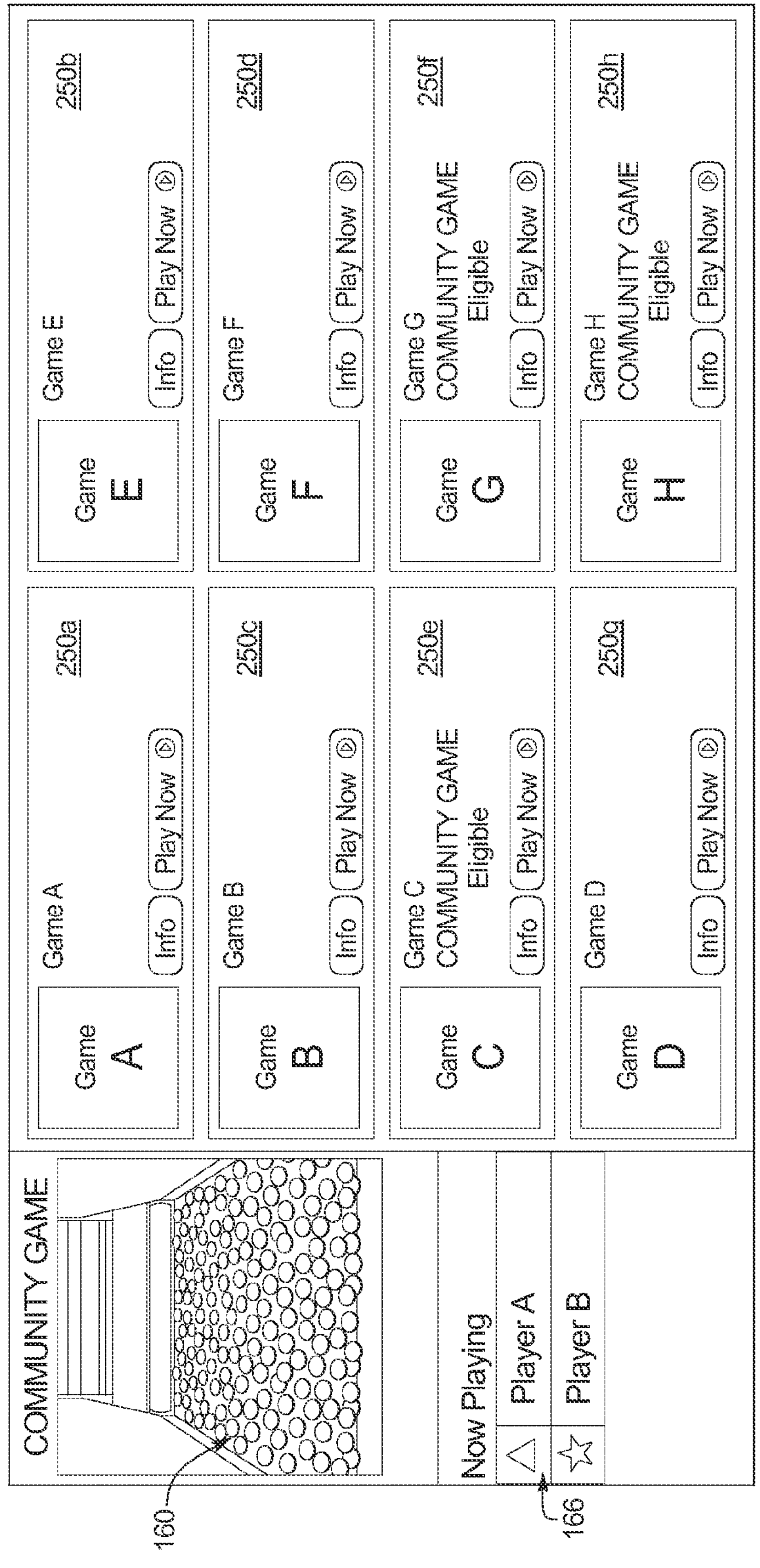
FIG. 7 is a front view of one example of a game play screen of a gaming device disclosed herein illustrating a portal of available primary games which the player may select to play.

In one embodiment, upon a game initiation event occurring, the gaming system displays a plurality of different primary games available for the player to play and which of these primary games are associated with one or more community games. For example, as seen in FIG. 7, upon a game initiation event occurring, the gaming system displays eight different primary games 250 available for the player to play. As also seen in FIG. 7, upon the game initiation event occurring, the gaming system displays that primary games 250*e*, 250*f* and 250*h* are each associated with at least one community game. In one such embodiment, a game initiation event occurs when a player submits (such as inserting) a player tracking card or inputs other identification into the gaming device. In another such embodiment, a game initiation event occurs when an unidentified player deposits an amount of money at the gaming device.

In one embodiment, the gaming system continually displays the currently maintained community games (or at least part of or the status of such community games). For example, as seen in FIG. 4C, in association with enabling the player to pick whether to participate in a current play of the coin pusher community game, the gaming system displays to the player the current status of this community game 160 to aid in the player's decision making of whether or not to participate in the current play of this community game. Moreover, as seen in FIG. 7, in association with enabling the player to pick which of the available primary games to play, the gaming system displays the current status of the coin pusher community game 160 to aid in a player's decision making of which primary game to play (i.e., whether or not to play a primary game currently associated with a community game). Such a configuration provides that players (and any bystanders watching any of the plays of any of the community games) are aware (or may become aware) of any events currently occurring in any of the community games and/or any awards provided in association with any play of any of the community games.

In another embodiment, the gaming system continually displays information about one or more of the player's currently playing at a gaming device in the system. For example, as seen in FIG. 4D, the gaming system utilizes a community game update indicator 162 to display which players recently earned community game entries 162. As also seen in FIG. 4D, the gaming system utilizes a leader board 164 to display how many total community game entries a plurality of different player's have each accumulated. In another example, as seen in FIGS. 4D and 7, in association with enabling the player to pick which of the available primary games to play, to aid in the player's decision making of which primary game to play, the gaming system displays which players are currently playing the coin pusher community game 166. Such a configuration provides that players (and any bystanders watching any of the plays of any of the games) are aware (or may become aware) of other player's experiences in association with any play of any of the games. That is, unlike certain known community games in which a player is only able to view what that player wins (and is unable to see what other player's win), the present disclosure enables other players (or bystanders) to view how and what a player wins.

In one embodiment, as described above, the gaming system displays to the players information regarding the individual bonus games and/or community games currently maintained by the gaming system. In another embodiment, the gaming system displays certain information, but not all information regarding such individual bonus games and/or community games. For example, in enabling a player to decide to play an individual bonus game or a community game, the gaming system only displays the range of available awards for the individual bonus game and the community game. In another embodiment, the gaming system does not display any information to the players regarding such individual bonus games and/or community games.

Alternative Embodiments

It should be appreciated that in different embodiments, one or more of:

i. when an individual bonus game triggering event occurs;
ii. how an individual bonus game triggering event occurs;
iii. which individual bonus game to offer to a player;
iv. one or more features or attributes of the individual bonus game to offer to a player;
v. which community game to offer to a player;
vi. one or more features or attributes of the community game to offer to a player;
vii. a portion of a community award to provide to a player;
viii. when to enable a player to save one or more community game entries;
ix. a duration which a player may save one or more community game entries;
x. a quantity of community game entries a player may save at any point in time;
xi. an award associated with any coins provided to a player;
xii. a size of a player's coin collection sub-area;
xiii. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions, which when executed by the at least one processor, causes the at least one processor to operate with the at least one input device and the at least one display device to:

(a) enable a player to place a wager to play a primary game; and (b) if an individual bonus game triggering event occurs:

(i) select one of a plurality of different individual bonus games, (ii) determine, at least in part based on an average expected payout of the selected individual bonus game, a community game, (iii) enable the player to select any one of:

(A) a play of the selected individual bonus game, and (B) a play of the selected community game, (iv) if the player selects the play of the selected individual bonus game:

(A) determine an individual bonus game award, (B) provide the determined individual bonus game award to the player, and (C) not provide any community game award to the player, and (v) if the player selects the play of the determined community game:

(A) determine a community game award, (B) provide the determined community game award to the player, and (C) not provide any individual bonus game award to the player.

2. The gaming system of claim 1, wherein when executed by the at least one processor, the plurality of instructions causes the at least one processor to determine, based on at least one player input, at least one of: the individual bonus game and the individual bonus game award.

3. The gaming system of claim 1, wherein when executed by the at least one processor, the plurality of instructions causes the at least one processor to determine, based, at least in part, on at least one player input, at least one of: the determined community game and the determined community game award.

4. The gaming system of claim 1, wherein the selected individual bonus game has a first average expected payout and the determined community game has the first average expected payout.

5. The gaming system of claim 1, wherein when executed by the at least one processor, the plurality of instructions causes the at least one processor to operate with at least one community display device to display at least one of: any determined individual bonus game awards and any determined community game awards.

6. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a community game; and (b) if an individual bonus game triggering event occurs in association with one of the gaming devices:

(i) select one of a plurality of different individual bonus games, (ii) determine at least one feature associated with the maintained community game, the at least one feature associated with the maintained community game being based, at least in part, on an average expected payout of the selected individual bonus game, (iii) enable a player of said gaming device to select any one of:

(A) a play of the selected individual bonus game, and (B) a play of the maintained community game associated with the at least one determined feature, (iv) if the player selects the play of the selected individual bonus game:

(A) determine an individual bonus game award, (B) provide the determined individual bonus game award to the player, and (C) not provide any community game award to the player, and (v) if the player selects the play of the maintained community game:

(A) determine a community game award, said determined based, at least in part, on the at least one determined feature, (B) provide the determined community game award to the player, and (C) not provide any individual bonus game award to the player.

7. The gaming system of claim 6, wherein the at least one controller is configured to determine, based on at least one player input, at least one of:

the individual bonus game and the individual bonus game award.

8. The gaming system of claim 6, wherein the at least one controller is configured to determine, based, at least in part, on at least one player input, at least one of: the at least one feature associated with the community game and the community game award.

9. The gaming system of claim 6, wherein the selected individual bonus game has a first average expected payout and the maintained community game associated with the at least one determined feature has the first average expected payout.

10. The gaming system of claim 6, wherein the at least one controller is configured to operate with at least one community display device to display at least one of: any determined individual bonus game awards and any determined community game awards.

11. A method of operating a gaming system, said method comprising:

(a) enabling a player to place a wager to play a primary game; and (b) if an individual bonus game triggering event occurs:

(i) causing at least one processor to execute a plurality of instructions to select one of a plurality of different individual bonus games, (ii) causing the at least one processor to execute the plurality of instructions to determine, at least in part based on an average expected payout of the selected individual bonus game, a community game, (iii) enabling the player to select any one of:

(A) a play of the selected individual bonus game, and (B) a play of the determined community game, (iv) if the player selects the play of the selected individual bonus game:

(A) causing the at least one processor to execute the plurality of instructions to determine an individual bonus game award, (B) providing the determined individual bonus game award to the player, and (C) not providing any community game award to the player, and (v) if the player selects the play of the determined community game:

(A) causing the at least one processor to execute the plurality of instructions to determine a community game award, (B) providing the determined community game award to the player, and (C) not providing any individual bonus game award to the player.

12. The method of claim 11, which includes causing the at least one processor to execute the plurality of instructions to determine, based on at least one player input, at least one of: the individual bonus game and the individual bonus game award.

13. The method of claim 11, which includes causing the at least one processor to execute the plurality of instructions to determine, based, at least in part, on at least one player input, at least one of: the determined community game and the determined community game award.

14. The method of claim 11, wherein the selected individual bonus game has a first average expected payout and the determined community game has the first average expected payout.

15. The method of claim 11, which includes causing at least one community display device to display at least one of: any determined community game awards and any determined individual bonus game awards.

16. The method of claim 11, which is provided through a data network.

17. The method of claim 16, wherein the data network is the internet.

18. A method of operating a gaming system, said method comprising:

(a) causing at least one processor to execute a plurality of instructions to maintain a community game; and (b) if an individual bonus game triggering event occurs in association with one of the gaming devices:

(i) causing the at least one processor to execute the plurality of instructions to select one of a plurality of different individual bonus games, (ii) causing the at least one processor to execute the plurality of instructions to determine at least one feature associated with the maintained community game, the at least one feature associated with the maintained community game being based, at least in part, on an average expected payout of the selected individual bonus game, (iii) enabling a player of said gaming device to select any one of:

(A) a play of the selected individual bonus game, and (B) a play of the maintained community game associated with the at least one determined feature, (iv) if the player selects the play of the selected individual bonus game:

(A) causing the at least one processor to execute the plurality of instructions to determine an individual bonus game award, (B) providing the determined individual bonus game award to the player, and (C) not providing any community game award to the player, and (v) if the player selects the play of the maintained community game:

(A) causing the at least one processor to execute the plurality of instructions to determine a community game award, said determined based, at least in part, on the at least one determined feature, (B) providing the determined community game award to the player, and (C) not providing any individual bonus game award to the player.

19. The method of claim 18, which includes causing the at least one processor to execute the plurality of instructions to determine, based on at least one player input, at least one of: the individual bonus game and the individual bonus game award.

20. The method of claim 18, which includes causing the at least one processor to execute the plurality of instructions to determine, based, at least in part, on at least one player input, at least one of: the at least one feature associated with the community game and the community game award.

21. The method of claim 18, wherein the selected individual bonus game has a first average expected payout and the maintained community game associated with the at least one determined feature has the first average expected payout.

22. The method of claim 18, which includes causing at least one community display device to display at least one of: any determined community game awards and any determined individual bonus game awards.

23. The method of claim 18, which is provided through a data network.

24. The method of claim 23, wherein the data network is the internet.

* * * * *

UNITED STATES PATENT AND TRADEMARK OFFICE

CERTIFICATE OF CORRECTION

PATENT NO. : 8,517,818 B2
APPLICATION NO. : 13/247115
DATED : August 27, 2013
INVENTOR(S) : Mark C. Nicey et al.

It is certified that error appears in the above-identified patent and that said Letters Patent is hereby corrected as shown below:

IN THE CLAIMS

In Claim 6, Column 38, Line 42, between “determined” and “based” insert --community game award--.
In Claim 17, Column 39, Line 55, replace “the” with --an--.
In Claim 18, Column 40, Line 2, replace “one of the gaming devices” with --a gaming device--.
In Claim 18, Column 40, Line 31, between “determined” and “based” insert --community game award--.
In Claim 24, Column 40, Line 58, replace “the” with --an--.

Signed and Sealed this
Thirtieth Day of September, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,517,818 B2
APPLICATION NO. : 13/247115
DATED : August 27, 2013
INVENTOR(S) : Mark C. Nicey et al.

It is certified that error appears in the above-identified patent and that said Letters Patent is hereby corrected as shown below:

IN THE CLAIMS

In Claim 1, Column 37, Line 24, replace “causes” with --cause--.
In Claim 2, Column 37, Line 55, replace “causes” with --cause--.
In Claim 3, Column 37, Line 60, replace “causes” with --cause--.
In Claim 5, Column 38, Line 3, replace “causes” with --cause--.

Signed and Sealed this
Sixth Day of January, 2015

Michelle K. Lee
*Deputy Director of the United States Patent and Trademark Office*